US006337931B1

(12) United States Patent
Seino

(10) Patent No.: US 6,337,931 B1
(45) Date of Patent: Jan. 8, 2002

(54) EFFECTIVE OPTICAL PATH LENGTH COMPENSABLE OPTICAL DEVICE

(75) Inventor: Minoru Seino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/049,993

(22) Filed: Mar. 30, 1998

(30) Foreign Application Priority Data

Sep. 25, 1997 (JP) ........................................... 9-260413

(51) Int. Cl.[7] ................................................ G02B 6/27

(52) U.S. Cl. ............................ 385/11; 385/14; 385/40; 385/130

(58) Field of Search .............................. 385/11, 14, 39, 385/40, 129, 130

(56) References Cited

U.S. PATENT DOCUMENTS 4,886,332 A * 12/1989 Wolfe ..................... 350/96.12
5,361,157 A * 11/1994 Ishikawa et al. ............ 359/168
5,623,571 A * 4/1997 Chou et al. ................. 385/130
5,796,882 A * 8/1998 Schmid ....................... 385/11
5,832,146 A * 11/1998 Bruno ......................... 385/11
5,930,038 A * 7/1999 Swan ......................... 359/484
5,937,113 A * 8/1999 He et al. ...................... 385/11

* cited by examiner

*Primary Examiner*—John D. Lee
*Assistant Examiner*—Jennifer Doan
(74) *Attorney, Agent, or Firm*—Staas & Halsey LLP

(57) ABSTRACT

The present invention relates to an optical device to be used for, for example, terminal apparatus or repeating installations of optical communication systems. In order to reduce an inter-polarization error of an optical signal taking place at input of an optical signal with a high bit rate to enhance the optical signal communication accuracy, the optical device is constructed such that optical waveguides are formed on substrates each having a double refraction, and the two inter-polarization effective optical path lengths for the optical signal are made to be equal to each other at the optical signal propagation in the optical waveguides.

30 Claims, 11 Drawing Sheets

EFFECTIVE OPTICAL PATH LENGTH COMPENSABLE OPTICAL DEVICE

BACKGROUND OF THE INVENTION

1) Field of the Invention

The present invention relates to an optical device to be suitably used for the reduction of inter-polarization errors in optical signals taking place in conjunction with the higher-speed oriented transmission of optical signals, for example, in terminal apparatus or repeating installations of optical communication systems.

In recent years, in accordance with the progress of advanced information-centered society, a demand arises for the transmission of a huge quantity of information, so that an optical communication system designed to transmit information in the form of optical signals has been put to practical use as a means for the transmission of such a huge quantity of information.

In the optical communication system, with the increase in signal modulation speed, approaches to higher-speed transmission have been taken year by year, and an optical device of an optical waveguide type having a double refraction (birefringence), such as an optical external modulator for accomplishing the high-speed modulation of signals, has been in use in every place.

In addition, recently, approaches to the use of the optical waveguide type device have been taken even in the field of measurements and others.

2) Description of the Related Art

So far, in the prior optical communication systems, the transmission speed (bit rate) of digital optical signals has mainly been below 1 Gb/s, and in the case of transmitting the optical signals at such a transmission speed, the length of a 1-bit optical pulse in an optical signal (the bit length of an optical signal=the velocity of light in a propagating medium×the light emission time per 1 bit) exceeds 30 cm.

Now, let it be assumed that an optical device is constructed with a lithium niobate ($LiNbO_3$) substrate (board) having an extremely high double refraction. In this case, since the double-refractive index difference of the lithium niobate substrate due to the light polarization (TE mode and TM mode) in an optical signal is approximately 0.08, for instance, even in case where an optical signal propagates within an optical device having a length of approximately 40 mm, a bit error of approximately 3.2 mm only occurs between the polarization components of the optical signal. Further, such a bit error is as small as approximately 2% of the bit length of the optical signal even taking into consideration the double refraction of the lithium niobate substrate, and therefore, particularly attention has not been paid toward this bit error.

Besides, in the prior optical communication systems, the optical devices on which the double refraction has adverse influence have not been put to use.

Incidentally, in a transmission section of a terminal apparatus of an optical communication system, an optical modulator where an optical waveguide is made in a lithium niobate substrate has been employed as an optical device, and since this optical modulator deals with a single polarization, the above-mentioned bit error does not occur.

There is a problem which arises with the prior optical communication systems, however, in that, in the case that the optical signal transmission speed increases, difficulty is encountered to disregard the influence from the above-mentioned bit error.

For instance, in the case that the optical signal transmission speed reaches 10 Gb/s, the bit length of the optical signal comes to approximately 3 cm, and when the optical signal transmission speed reaches 40 Gb/s, the bit length of the optical signal comes to approximately 7.5 mm. If propagating the data with such a bit rate within the foregoing optical device, the information representative of the optical signal can undergo damages due to the influence from the bit error of approximately 3.2 mm.

Moreover, in recent years, in the optical communication system, in addition to the terminal apparatus, an optical device having a double refraction starts to be used even for repeating installations placed in transmission lines, and therefore, consideration should also be given to the effects from the accumulation of bit errors caused by this double refraction.

FIG. 11 is an illustration of one example of the countermeasures against the double refraction.

In FIG. 11, an optical device 100 is designed to make optical signals inputted from a plurality of input optical waveguides 101*a* interfere with each other to output the optical signals through desired output optical waveguides 101*f*, and functions as an array waveguide type diffraction grating.

Reference numeral 101 represents an optical waveguide assembly comprising the input optical waveguides 101*a*, a plane optical waveguide 101*b*, channel optical waveguides 101*c*, 101*d*, a plane optical waveguide 101*e*, and the output optical waveguides 101*f*. The input optical waveguides 101*a* and the output optical waveguides 101*f*, the plane optical waveguide 101*b* and the plane optical waveguide 101*e*, and the channel optical waveguides 101*c* and the channel optical waveguides 101*d* are formed into symmetric configurations, respectively.

Although this optical waveguide assembly 101 is constructed in a manner that a glass ($SiO_2$) is melted on a silicon (Si) substrate at a high temperature, since stress occurs in the optical waveguide assembly 101 in the process of returning the temperature of the glass melted at the high temperature to the room temperature, the optical waveguide assembly 101 gets to show a double refraction.

When the optical waveguide assembly 101 thus has the double refraction, since a phase error takes place between the polarization components of an optical signal propagating within the optical waveguide assembly 101, the respective polarization components of the optical signal exit from the different optical waveguides 101*f*.

In addition, in this optical device 100, a half-wave plate 102 for the conversion of the polarization condition of an optical signal is disposed at an middle position of the optical waveguide assembly 101 (between the channel optical waveguides 101*c* and the channel optical waveguides 101*d*) in a state of being inclined by 45 degrees with respect to the respective channel optical waveguides 101*c* and 101*d*, thereby rotating the polarization condition of the optical signal by 90 degrees so that the inter-polarization effective optical path lengths for the optical signal (polarization-separated optical signals) become equal to each other to offset the phase error between the polarization components due to the double refraction.

However, the phase error between the polarization components the optical device 100 shown in FIG. 11 tries to reduce occurs because the phase of the light wave of the optical signal shifts, but essentially differing from the aforesaid bit error (which takes place because the bit itself of an optical signal shifts) occurring, in conjunction with the high speed transmission of optical signals, due to the double refraction of the optical device constructed using a lithium niobate substrate or the like.

That is, the phase error between the polarization components treated as a problem in FIG. 11 assumes as a value as the order of the wavelength of an optical signal (as the case may be, several times the order of the wavelength), whereas the above-mentioned optical signal bit error reaches a large value above 1000 times the phase error.

In the case of an optical signal with as a very high speed as tera bit being inputted to the optical device 100, although it may be considered that the optical device 100 can reduce the bit error of the optical signal because the bit length of the optical signal becomes approximately 150 μm (approximately 1/10 of the order of the wavelength of the optical signal), in fact the optical device 100 is incapable of reducing the bit error of the optical signal.

This is because the optical device 100 originally exerts its function by successively shifting optical signals in the channel waveguides 101*c*, 101*d* and by collecting the optical signals shifted by several tens μm to beyond several mm as a whole and hence, in response to the input of such a very high speed optical signal, does not successfully work because difficulty is experienced to ignore the bit length of the optical signal.

SUMMARY OF THE INVENTION

The present invention has been developed with a view to eliminating these problems, and it is therefore an object of the present invention to provide an optical device which is capable of reducing the inter-polarization errors of optical signals taking place owing to the input of a high-speed optical signal to improve the communication accuracy of the optical signals.

For this purpose, an optical device according to this invention features an arrangement in which an optical waveguide is formed on a substrate having a double refraction and, when an optical signal propagates through the optical waveguide, the two inter-polarization effective optical path lengths for the optical signal are identical with each other.

In order to equalize the two inter-polarization effective optical path lengths for the optical signal to each other, the optical device according to this invention can be built in a manner of connecting two double refraction optical waveguides, contrary in double refraction characteristic (property) based on polarization to each other, in series to each other.

The two double refraction optical waveguides can also be coupled to each other in a state where a polarization maintaining fiber capable of maintaining the polarization condition of the optical signal is interposed therebetween. In this case, the lengths of the two double refraction optical waveguides can be set to offset the double refraction characteristics of the two double refraction optical waveguides and the polarization maintaining fiber as a whole.

Furthermore, for the purpose of equalizing the two inter-polarization effective optical path lengths for the optical signal, the optical device according to this invention can also be constructed such that an optical waveguide is formed on a substrate with the double refraction and a polarization maintaining fiber contrary in double refraction characteristic based on polarization to the optical waveguide is coupled to the optical waveguide on the substrate.

Still further, for equalizing the two inter-polarization effective optical path lengths for the optical signal, the optical device according to this invention can also be constructed so that a plurality of optical communication elements each having a peculiar double refraction are in connection and the double refractions of the plurality of optical communication elements are offset as a whole.

Moreover, for equalizing the two inter-polarization effective optical path lengths for the optical signal, the optical device according to this invention can also be constructed so that a plurality of optical waveguides having the same length are formed on the same substrate having a double refraction and the plurality of optical waveguides are coupled to each other in a state where polarization maintaining fibers capable of maintaining the polarization condition of the optical signal is interposed therebetween and the double refractions due to the plurality of optical waveguides and the polarization maintaining fibers are offset as a whole. In this case, the polarization maintaining fibers are made to conduct the conversion of the polarization condition of the optical signal propagating.

In addition, for equalizing the two inter-polarization effective optical path lengths for the optical signal, the optical device according to this invention can also be designed so that a plurality of substrates having the same double refraction are provided and two optical waveguides equal in length to each other are formed on each of the plurality of substrates while the optical waveguides on the plurality of substrates are coupled in series to each other in a state where polarization maintaining fibers capable of conducting the conversion of the polarization condition of the optical signal are put therebetween and the double refractions due to the optical waveguides on the plurality of substrates and the polarization maintaining fibers are canceled as a whole.

Furthermore, for equalizing the two inter-polarization effective optical path lengths for the optical signal, the optical device according to this invention can be designed such that the optical waveguide comprises a polarization separating section for separating the polarization condition of the optical signal inputted, two paths for wave-guiding the optical signals polarization-separated in the polarization separating section, and a multiplexing section for again multiplexing the two optical signals wave-guided through the paths, and, of the two paths, the one path for wave-guiding the optical signal of the two polarization-separated optical signals which has a smaller refractive index is set to be longer than the other.

Still further, for equalizing the two inter-polarization effective optical path lengths for the optical signal, the optical device according to this invention can be designed such that the optical waveguide comprises a polarization separating section for separating the polarization condition of the optical signal inputted, two paths for wave-guiding the optical signals polarization-separated in the polarization separating section, and a multiplexing section for again multiplexing the two optical signals wave-guided through the paths, and an area constituting at least a portion of one of the two paths is formed with a buffer layer different from that of the other path.

Moreover, for equalizing the two inter-polarization effective optical path lengths for the optical signal, the optical device according to this invention can be designed such that at least one of the optical waveguides is formed on the same substrate having a double refraction and a polarization condition converting element for performing the conversion of the polarization condition of the optical signal is disposed at an intermediate position of the optical waveguide.

In addition, the optical device according to this invention can also be made such that the optical waveguide comprises a polarization separating section for separating the polarization condition of the optical signal inputted, two paths for wave-guiding the optical signals polarization-separated in the polarization separating section, and a multiplexing section for again multiplexing the two optical signals wave-guided through the paths, and a polarization condition converting element for performing the conversion of the polarization condition of each of the two optical signals polarization-separated in the polarization separating section is placed at a position where the two inter-polarization effective optical path lengths for the optical signal become equal to each other.

Thus, since the optical device according to this invention is made such that the two inter-polarization effective optical path lengths for an optical signal become identical with each other, it is possible to reduce the bit error of an optical signal (high-speed optical signal) taking place at the input of the optical signal with a high bit rate, with the result that the improvement of the communication accuracy becomes feasible in optical communication systems for the transmission of high-speed optical signals.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

(a) Description of First Embodiment

Figure 1:
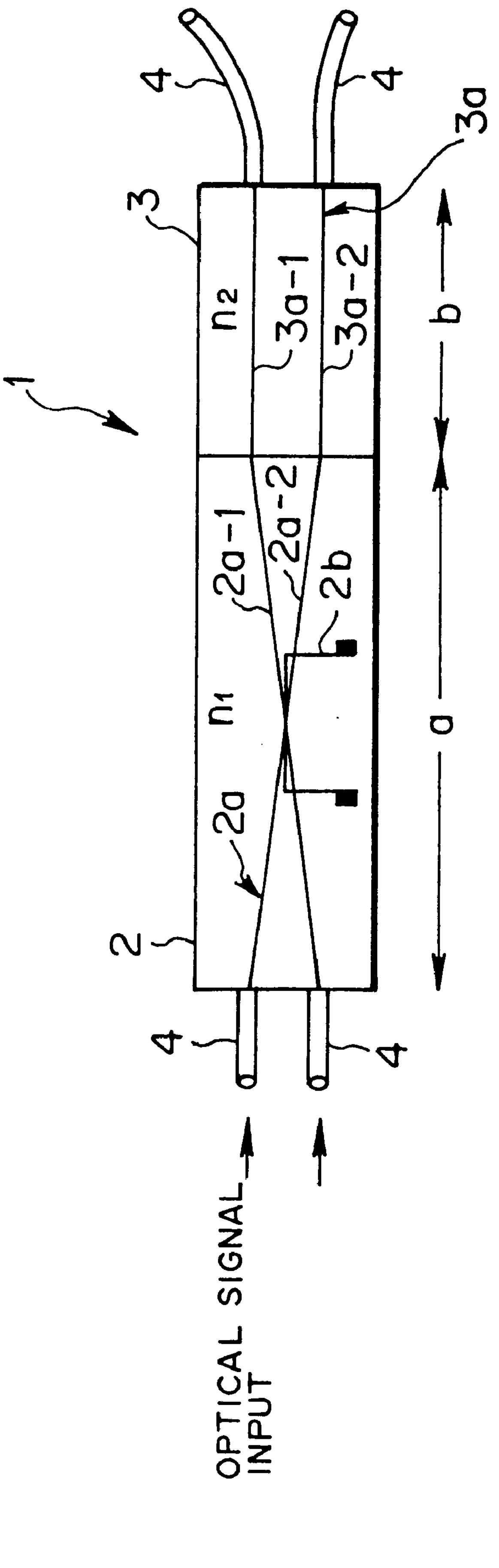
FIG. 1 illustratively shows a construction of an optical device according to a first embodiment of the present invention.

FIG. 1 illustratively shows a construction of an optical device according to a first embodiment of the present invention. In FIG. 1, the optical device, generally designated at reference numeral 1, functions as an optical switch for switching optical signals, where optical waveguide assemblies 2*a*, 3*a* are formed on substrates 2, 3 having double refractions, respectively, and optical signals (digital signals) propagate through these optical waveguide assemblies 2*a*, 3*a*.

The optical waveguide assembly (cross optical waveguide) 2*a* on the substrate 2 is made such that two straight optical waveguides 2*a*-1, 2*a*-2 having the same length intersect at a central position, while the optical waveguide assembly (parallel optical waveguide) 3*a* is made such that two straight optical waveguides 3*a*-1, 3*a*-2 having the same length are parallel to each other.

Furthermore, on a surface of the substrate 2 and at a position corresponding to the crossing position in the optical waveguide assembly 2*a*, there is formed an electrode section 2*b* which gives an electric potential for the switching control of optical signals propagating in the optical waveguide assembly 2*a*. In other words, the substrate 2 is equivalent to an optical switch for switching optical signals.

In addition, the substrates 2, 3 are coupled directly and in series to each other so that the end portions of the optical waveguide assemblies 2*a*, 3*a* take direct connection with each other.

The optical waveguide assemblies 2*a*, 3*a* are made by diffusing a metal such as titanium (Ti) into the substrates 2, 3, whereas the electrode section 2*b* is formed by depositing a metal such as gold (Au) on the substrate 2.

Moreover, in FIG. 1, numeral 4 denotes optical fibers through which optical signals propagate.

Each of the substrates 2, 3 are designed to have a double refraction so that their double refraction characteristics due to light polarization are contrary to each other. That is, as the substrates 2, 3, employed are substrates in which their double-refractive indexes assume values opposite in magnitude to each other in relation to the TE mode light and TM mode light.

For instance, a lithium niobate substrate is used as a substrate showing a double refraction, and two lithium niobate substrates different in crystal cutting direction from each other are employed as the two substrates in which the double refraction characteristics due to light polarization are contrary to each other. For example, a lithium niobate substrate (Z-cut $LiNbO_3$) where the crystal structure is cut in the Z-axial direction is used as the substrate 2, whereas a lithium niobate substrate (X-cut $LiNbO_3$) where the crystal structure is cut in the X-axial direction is used as the substrate 3.

As mentioned before, when a high-speed optical signal is inputted to an optical device having a double refraction, due to this double refraction, the bit error of the optical signal takes place between the polarization components (the TE mode light and the TM mode light which are the polarization components intersecting with each other) of the optical signal propagating in the optical waveguide assembly 2*a*.

In this instance, the optical device 1 shown in FIG. 1 is constructed so that, when the optical signals propagate through the optical waveguide assemblies 2*a*, 3*a*, the two inter-polarization effective optical path lengths for the optical signal become identical with each other.

More specifically, for the purpose of equalizing the two inter-polarization effective optical path lengths, substrates having an appropriate double refraction are used as the substrates 2, 3 and the lengths of the substrates 2, 3 in the optical signal propagating direction are set, thus satisfying the conditions representative of the following equation (1).

In the following equation (1), the effective refractive indexes of the substrate 2 for the TE mode light and the TM mode light are respectively taken to be $n_{1(TE)}$, $n_{1(TM)}$, the effective refractive indexes of the substrate 3 for the TE mode light and the TM mode light are respectively taken to be $n_{2(TE)}$, $n_{2(TM)}$, and the lengths of the substrates 2, 3 in the optical signal propagating direction are respectively taken as a, b.

$$n_{1(TE)}\cdot a+n_{2(TE)}\cdot b\approx n_{1(TM)}\cdot a+n_{2(TM)}\cdot b \tag{1}$$

In the first embodiment, since the lengths of the two straight optical waveguides 2*a*-1, 2*a*-2 organizing the optical waveguide assembly 2*a* are equal to each other and the lengths of the two straight optical waveguides 3*a*-1, 3*a*-2 constituting the optical waveguide assembly 3*a* are also identical with each other, the two inter-polarization effective optical path lengths can be equalized in a manner of setting the lengths of the substrates 2, 3.

On the contrary, in place of setting the lengths of the substrates 2, 3, it is also appropriate to equalize the two inter-polarization effective optical path lengths by setting the length of the optical waveguide assemblies 2*a*, 3*a* each having a double refraction.

A brief description of the optical device 1 according to the first embodiment is that, in order to equalize the two inter-polarization effective optical path lengths for an optical signal, two double refraction optical waveguide assemblies 2*a*, 3*a* having double refraction characteristics due to the polarization opposite to each other are coupled in series to each other.

With the above-described structure, in the optical device 1 according to the first embodiment of this invention, for example, when two kinds of optical signals are inputted through the input side optical fibers 4 to the two straight optical waveguides 2*a*-1, 2*a*-2 of the optical waveguide assembly 2*a*, the switching between the optical signals propagating in the optical waveguide assembly 2*a* is made under the switching control of the electrode section 2*b* . For instance, owing the switching control, the optical signal inputted to the straight optical waveguide 2*a*-1 is then inputted to the straight optical waveguide 3*a*-1, while the optical signal inputted to the straight optical waveguide 2*a*-2 is subsequently inputted to the straight optical waveguide 3*a*-2.

When the optical signals advance through the double refraction optical waveguide assembly 2*a*, the optical signal bit error occurs between the polarization components of the optical signals, and hence, the optical signal with the bit error from the optical waveguide assembly 2*a* is inputted to the optical waveguide assembly 3*a*.

However, since the optical device 1 is constructed so that the two inter-polarization effective optical path lengths for the optical signals are identical with each other, while the optical signal inputted from the optical waveguide assembly 2*a* propagates within the double refraction optical waveguide assembly 3*a*, the optical signal bit error arising at the propagation in the optical waveguide assembly 2*a* is reducible, with the result that the switching between the optical signals is possible with a high performance.

The optical signals passing through the straight optical waveguides 3*a*-1, 3*a*-2 of the optical waveguide assembly 3*a* are outputted through the output side optical fibers 4, respectively.

As described above, in the optical device 1 according to the first embodiment of this invention, two double refraction optical waveguide assemblies having double refraction characteristics due to the polarization contrary to each other are coup led in series to each other in order to equalize the two inter-polarization effective optical path lengths for an optical signal, thus reducing the optical signal bit error occurring at the input of optical signals (high-speed optical signals) having a high bit rate, with the result that the communication accuracy of an optical communication system for the transmission of the high-speed optical signals is improvable.

(a1) Description of First Modification of First Embodiment

Figure 2:
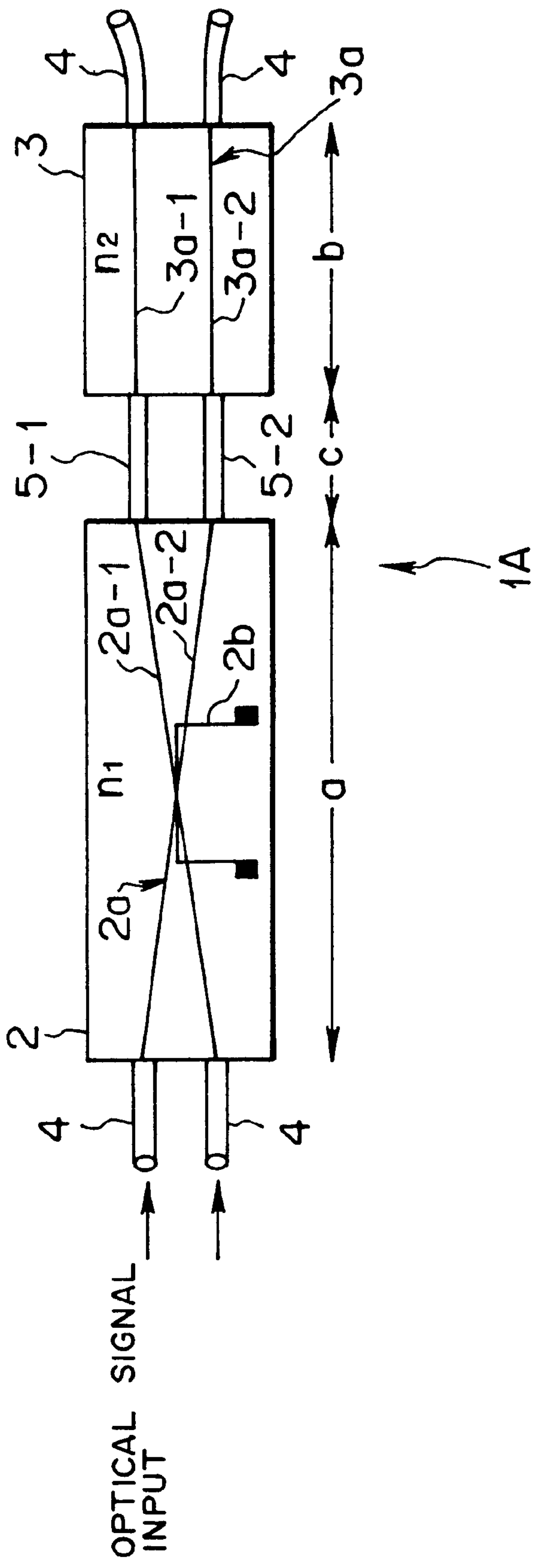
FIG. 2 illustratively shows a construction of an optical device according to a first modification of the first embodiment of this invention.

FIG. 2 illustratively shows a construction of an optical device according to a first modification of the first embodiment of this invention. Likewise, an optical device 1A shown in FIG. 2 is made such that optical waveguide assemblies 2*a*, 3*a* are formed on substrates 2, 3 each having a double refraction and optical signals propagate through these optical waveguide assemblies 2*a*, 3*a*, and functions as an optical switch as well as that of FIG. 1.

Although the substrates 2, 3, the optical waveguide assemblies 2*a*, 3*a*, an electrode section 2*b* and optical fibers 4 are respectively the same as those in the first embodiment, the difference of the optical device 1A from the first embodiment is that, instead of the substrates 2, 3 and the optical waveguide assemblies 2*a*, 3*a* being connected directly and in series to each other, they are coupled in series to each other through polarization maintaining fibers 5-1, 5-2 capable of maintaining the polarization conditions of optical signals.

In this case, additionally taking into consideration the double refractions of the polarization maintaining fibers 5-1, 5-2, set are the lengths of the substrates 2, 3 (or the lengths of straight optical waveguides 2*a*-1, 2*a*-2, 3*a*-1, 3*a*-2 organizing the optical waveguide assemblies 2*a*, 3*a*).

In more detail, the lengths of the substrates 2, 3 (or the lengths of the two double refraction optical waveguide assemblies 2*a*, 3*a*) are set so that the double refraction characteristics of the two double refraction optical waveguide assemblies 2*a*, 3*a* and the polarization maintaining fibers 5-1, 5-2 are offset as a whole (so as to meet the conditions of the following equation (2)). In the following equation (2), the effective refractive indexes of the polarization maintaining fibers 5 for the TE mode light and the TM mode light are respectively taken to be $n_{3(TE)}$, $n_{3(TM)}$, and the lengths of the polarization maintaining fibers 5 are respectively taken as c.

$$n_{1(TE)}\cdot a+n_{2(TE)}\cdot b+n_{3(TE)}\cdot c\approx n_{1(TM)}\cdot a+n_{2(TM)}\cdot b+n_{3(TM)}\cdot c \tag{2}$$

With this structure, in the optical device 1A according to the first modification of the first embodiment of this invention, when two kinds of optical signals are inputted through the input side optical fibers 4 to the two straight optical waveguides 2*a*-1, 2*a*-2 of the optical waveguide assembly 2*a*, the switch operation between the optical signals propagating in the optical waveguide assembly 2*a* is conducted under the switching control of the electrode section 2*b*. For example, in accordance with the switching control thereof, the optical signal inputted to the straight optical waveguide 2*a*-1 is inputted to the polarization maintaining fiber 5-1, whereas the optical signal inputted to the straight optical waveguide 2*a*-2 is inputted to the polarization maintaining fiber 5-2.

While the optical signals propagate in the double refraction optical waveguide assembly 2*a*, since the optical signal bit error takes place between the polarization components of the optical signals, the optical signals involving the bit error are inputted from the optical waveguide assembly 2*a* to the polarization maintaining fibers 5-1, 5-2.

In addition, the two optical signals inputted from the straight optical waveguides 2*a*-1, 2*a*-2 propagate in the polarization maintaining fibers 5-1, 5-2 in a state of maintaining the polarization conditions, respectively, and come in the double refraction optical waveguide assembly 3*a* coupled to the polarization maintaining fibers 5-1, 5-2.

In this case, since this optical device 1A is made such that the two inter-polarization effective optical path lengths for the optical signal are equal to each other, when the optical signals propagate in the polarization maintaining fibers 5-1, 5-2 and the double refraction optical waveguide assembly 3*a*, the optical signal bit error occurring at the propagation in the optical waveguide assembly 2*a* is reducible, with the result that the switching of the optical signals is achievable with a high performance.

Incidentally, the optical signals passing through the straight optical waveguides 3*a*-1, 3*a*-2 of the optical waveguide assembly 3*a* are outputted through the output side optical fibers 4, respectively.

As described above, in the optical device 1A according to the first modification of the first embodiment of this invention, the lengths of the double refraction optical waveguide assemblies 2*a*, 3*a* are set so that the double refraction characteristics of the double refraction optical waveguide assemblies 2*a*, 3*a* and the polarization maintaining fibers 5-1, 5-2 are offset as a while in order to equalize the two inter-polarization effective optical path lengths for the optical signal, thus providing the same effects as those of the above-described optical device 1 according to the first embodiment.

(a2) Description of Second Modification of First Embodiment

Figure 3:
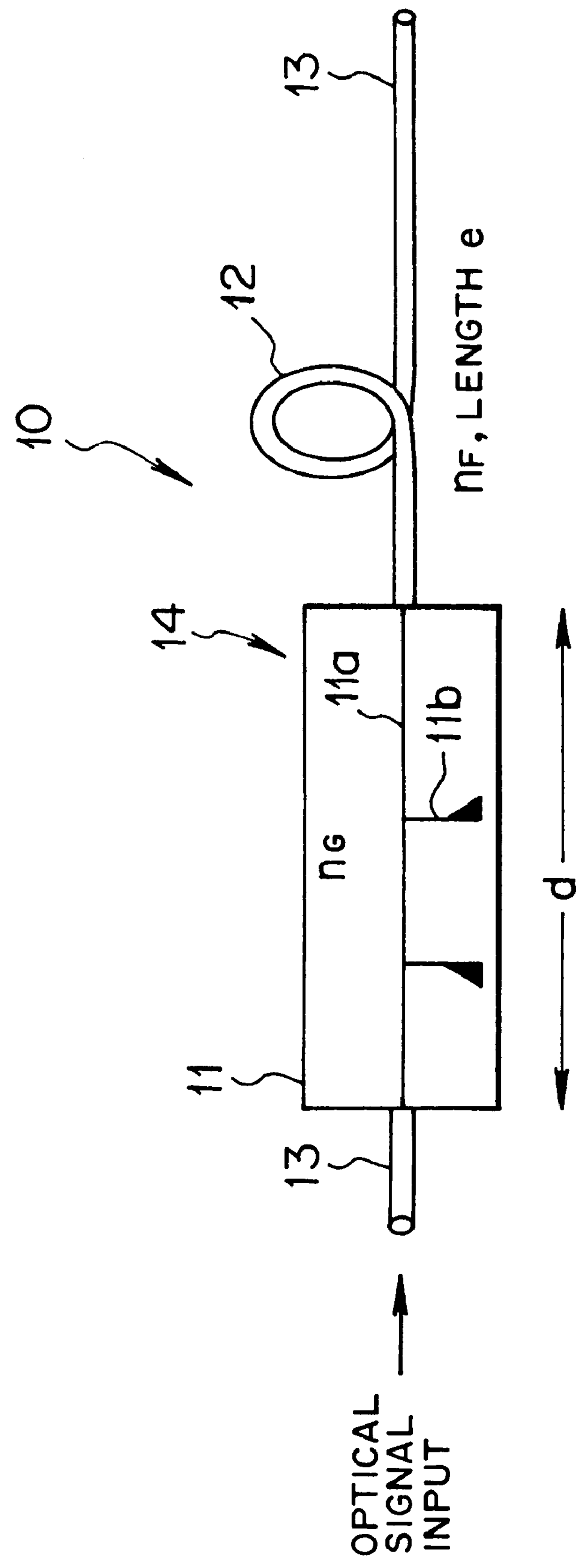
FIG. 3 illustratively shows a structure of an optical device according to a second modification of the first embodiment of this invention.

FIG. 3 illustratively shows an optical device according to a second modification of the first embodiment of this invention. An optical device 10 shown in FIG. 3 is designed such that an optical waveguide 11*a* is formed on a substrate 11 having a double refraction and a polarization maintaining fiber 12 having a double refraction is coupled to an output side end portion of the optical waveguide 11*a* on the substrate 11 so that an optical signal can propagate through the optical waveguide 11*a* and the polarization maintaining fiber 12, and serves as a phase modulator for conducting the phase modulation of the optical signal.

On the source of the substrate 11 and at a position corresponding to the position of the optical waveguide 11*a*, there is formed an electrode section 11*b* for giving an electric potential for the phase modulation of an optical signal propagating in the optical waveguide 11*a*. In other words, the substrate 11 is equivalent to a phase modulation section for the phase modulation of an optical signal.

Incidentally, the optical waveguide 11*a* is made by diffusing a metal such as titanium (Ti) into the substrate 11, whereas the electrode section 11*b* is formed by depositing a metal such as gold (Au) on the substrate 11.

Furthermore, in FIG. 3, numeral 13 depicts an optical fiber allowing the optical signal outputted from the polarization maintaining fiber 12 to propagate.

Although the substrate 11 and the polarization maintaining fiber 12 have double refractions, the double refraction characteristics based upon polarization is contrary to each other. That is, as the substrate 11 and the polarization maintaining fiber 12, employed are a substrate and a fiber in which the their double-refractive indexes assume values opposite in magnitude to each other in relation to the TE mode light and TM mode light.

In the optical device 10 according to the second modification of the first embodiment, in order to equalize the two inter-polarization effective optical path lengths for an optical signal, a substrate and a polarization maintaining fiber, which have appropriate double refractions, are used as the substrate 11 and the polarization maintaining fiber 12 and the length of the substrate 11 in the optical signal propagating direction and the length of the polarization maintaining fiber 12 are set, to satisfy the condition of the following equation (3).

In the following equation (3), the effective refractive indexes of the substrate 11 for the TE mode light and the TM mode light are respectively taken to be $n_{G(TE)}$, $n_{G(TM)}$, the effective refractive indexes of the polarization maintaining fiber 12 for the TE mode light and the TM mode light are respectively taken to be $n_{F(TE)}$, $n_{F(TM)}$, the length of the substrate 11 in the optical signal propagating direction (that is, the length of the optical waveguide 11*a*) is taken as d, and the length of the polarization maintaining fiber 12 is taken as e.

$$n_{G(TE)}\cdot d+n_{F(TE)}\cdot e=n_{G(TM)}\cdot d+n_{F(TM)}\cdot e \tag{3}$$

That is, the optical device 10 is constructed such that, in order to equalize the two inter-polarization effective optical path lengths for the optical signal, the optical waveguide 11*a* is formed on the substrate 11 having a double refraction, and the polarization maintaining fiber 12 having a double refraction characteristic due to the polarization contrary to that of the optical waveguide 11*a* is connected to the optical waveguide 11*a* on the substrate 11.

With this structure, in the optical device 10 according to the second modification of the first embodiment of this invention, when an optical signal is inputted through the input side optical fiber 13 to the optical waveguide 11*a*, the phase modulation of the optical signal is made on the basis of the electric potential from the electrode section 11*b*.

When the optical signal propagates in the double refraction optical waveguide 11*a*, the optical signal bit error occurs between the polarization components of the optical signals, and hence, the optical signal having the bit error is inputted from the optical waveguide 11*a* to the polarization maintaining fiber 12.

In this case, since the optical device 10 is made such that the two inter-polarization effective optical path lengths for the optical signal become equal to each other, when the optical signal inputted from the optical waveguide 11*a* propagates in the polarization maintaining fiber 12, the optical signal bit error occurring at the propagation in the optical waveguide 11*a* is reducible, with the result that the phase modulation of the optical signal is feasible with a high performance.

Incidentally, the optical signal propagating in the polarization maintaining fiber 12 is outputted through the output side optical fiber 13.

As described above, the optical device 10 according to the second modification of the first embodiment of this invention, in order to equalize the two inter-polarization effective optical path lengths for the optical signal, is provided with the polarization maintaining fiber 12 contrary in double refraction characteristic to the optical waveguide 11*a*, so that the same effects as those of the above-described optical device 1 according to the first embodiment are obtainable.

(a3) Description of Third Modification of First Embodiment

Figure 4:
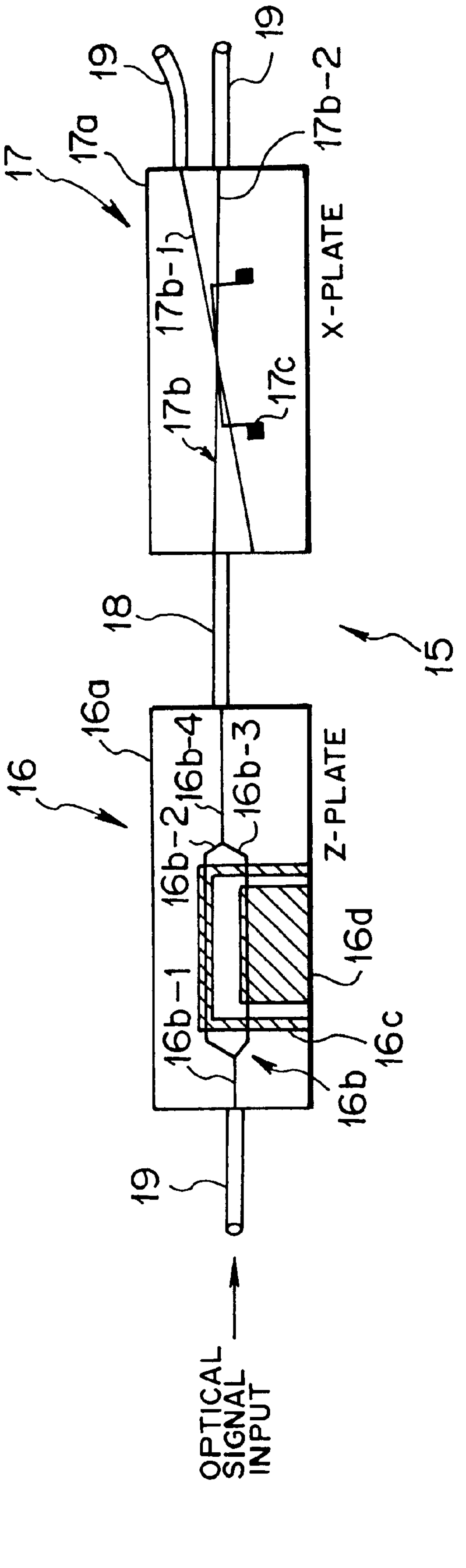
FIG. 4 illustratively shows a structure of an optical device according to a third modification of the first embodiment of this invention.
Figure 5:
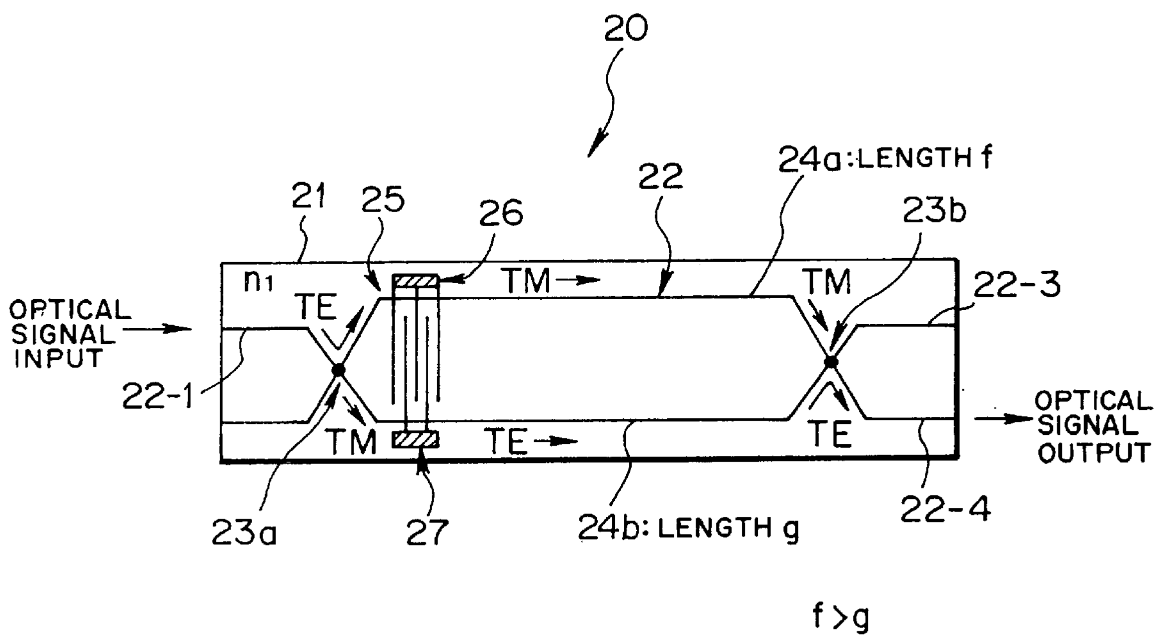
FIG. 5 illustratively shows a construction of an optical device according to a second embodiment of this invention.

FIG. 4 illustratively shows a structure of an optical device according to a third modification of the first embodiment of this invention. An optical device shown in FIG. 5 is equipped with an optical communication element 16 made by forming an optical waveguide assembly 16*b* on a substrate 16*a* having a double refraction and further provided with another optical communication element 17 made by forming an optical waveguide assembly 17*b* on a substrate 17*a* having a double refraction, with these optical communication elements 16, 17 being coupled through a polarization maintaining fiber 18 capable of maintaining the polarization conditions of optical signals in series to each other so that an optical signal can propagate throughout the optical waveguide assembly 16*b*, the polarization maintaining fiber 18 and the optical waveguide assembly 17*b*.

The optical waveguide assembly (Mach-Zehnder type optical waveguide) 16*b* on the substrate 16*a* comprises an input optical waveguide 16*b*-1, intermediate optical waveguides 16*b*-2, 16*b*-3 and an output optical waveguide 16*b*-4.

On the other hand, the optical waveguide assembly (crossing type optical waveguide) 17*b* on the substrate 17*a* comprises two straight optical waveguides 17*b*-1, 17*b*-2 made to have the same length and to intersect with each other at its central position.

Moreover, on the surface of the substrate 16*a*, electrode sections 16*c*, 16*d* for providing an electric potential for the intensity modulation of an optical signal propagating in the optical waveguide assembly 16*b* are formed at positions corresponding to the positions of the intermediate optical waveguides 16*b*-2, 16*b*-3 of the optical waveguide assembly 16*b*. That is, the optical communication element 16 functions as an intensity modulator for conducting the intensity modulation of an optical signal.

In addition, on the surface of the substrate 17*a*, an electrode section 17*c* for offering an electric potential for the switching control of an optical signal propagating in the optical waveguide assembly 17*b* is formed at a position corresponding to the intersecting position of the optical waveguide assembly 17*b*. That is, the optical communication element 17 functions as an optical switch for switching between optical signals.

Incidentally, the optical waveguide assemblies 16*b*, 17*b* are made by diffusing a metal such as titanium (Ti) into the substrates 16*a*, 17*a*, whereas the electrode sections 16*c*, 16*d* are formed by depositing a metal such as gold (Au) on the substrate 16*a* and the electrode section 17*c* is formed by depositing a metal such as gold (Au) on the substrate 17*a*.

Furthermore, an end portion of the output optical waveguide 16*b*-4 in the output side end surface of the optical communication element 16 is coupled through the polarization maintaining fiber 18 to an end portion of the straight optical waveguide (in FIG. 4, an end portion of the straight optical waveguide 17*b*-2) in the input side end surface of the optical communication element 17.

In FIG. 4, numeral 19 signifies optical fibers allowing the propagation of optical signals.

Although the substrates 16*a*, 17*a* are made to have double refractions, their double refraction characteristics due to the polarization are contrary to each other. That is, as the substrates 16*a*, 17*a*, employed are substrates in which their double-refractive indexes assume value s opposite in magnitude to each other in relation to the TE mode light and TM mode light. Besides, in FIG. 4, for the two substrates having the contrary double refraction characteristics due to the polarization, a lithium niobate substrate (Z-cut $LiNbO_3$) where the crystal structure is cut in the Z-axial direction is used as the substrate 16*a*, and a lithium niobate substrate (X-cut $LiNbO_3$) where the crystal structure is cut in the X-axial direction is used as the substrate 17*a*.

Also in the optical device 15 according to the third modification of the first embodiment, as in the case of the above-mentioned optical device 1A according to the first modification of the first embodiment, substrates having appropriate double refractions are put to use as the substrates 16*a*, 17*a*, while the lengths of the substrates 16*a*, 17*a* in the optical signal propagating direction (or the lengths of the optical waveguide assemblies 16*b*, 17*b*) are set additionally taking into consideration the double refraction of the polarization maintaining fiber 18.

More specifically, in order to equalize the two inter-polarization effective optical path lengths for an optical signal, the lengths of the substrates 16*a*, 17*a* (or the lengths of the two double refraction optical waveguide assemblies 16*b*, 17*b* ) are determined so that the double refractions of the two double refraction optical waveguide assemblies 16*b*, 17*b* and the polarization maintaining fiber 18 are canceled as a whole (that is, so that the conditions of the above-mentioned equation (2) are satisfied).

A brief description is that the optical device 15 is constructed such that pluralities of optical communication elements 16, 17 each having a peculiar double refraction are coupled to each other and the double refractions of the pluralities of optical communication elements 16, 17 are offset as a whole, thus equalizing the two inter-polarization effective optical path lengths for an optical signal.

With the above arrangement, in the optical device 15 according to the third modification of the first embodiment of this invention, when an optical signal is inputted through the input side optical fiber 19 to the input optical waveguide 16*b*-1 of the optical waveguide assembly 16*b* of the optical communication element 16, the optical signal is intensity-modulated by the electric potentials from the electrode sections 16*c*, 16*d*.

While the optical signal propagates in the double refraction optical waveguide assembly 16*b*, since an optical signal bit error takes place between the polarization components of the optical signal, the optical signal with the bit error is inputted from the output optical waveguide 16*b*-4 of the optical waveguide assembly 16*b* to the polarization maintaining fiber 18.

Furthermore, the optical signal inputted from the output optical waveguide 16*b*-4 is inputted through the polarization maintaining fiber 18 to the straight optical waveguide 17*b*-2 of the optical communication element 17.

In the optical communication element 17, under the switching control of the optical signal by the electrode section 17*c*, the optical signal propagating in the straight optical waveguide 17*b*-2 undergoes the switching operation. For example, the optical signal inputted to the straight optical waveguide 17*b*-2 is outputted from the lower output side optical fiber 19.

In this case, since the optical device 15 is made such that the two inter-polarization effective optical path lengths for the optical signal are identical with each other, when the optical signal passes through the polarization maintaining fiber 18 and the optical waveguide assembly 17*b*, the optical signal bit error occurring at the propagation in the optical waveguide assembly 16*b* is reducible, with the result that the intensity-modulating and switching operations for the optical signal are feasible with a high performance.

Thus, in the optical device 15 according to the third modification of the first embodiment of this invention, in order to equalize the two inter-polarization effective optical path lengths for the optical signal, pluralities of optical communication elements 16, 17 each having a peculiar double refraction are coupled to each other and the double refractions of the optical communication elements 16, 17 are offset as a whole, which can provide the same advantages as those of the above-described optical device 1 according to the first embodiment.

Particularly, in the case of constructing an optical communication system by connecting a large number of optical communication elements each having a double refraction in series to each other, if the optical communication elements are in connection at random, there is a possibility of the accumulation of the difference between the two inter-polarization effective optical path lengths based on the double refraction. Contrary to this, according to this modification, the optical communication elements are controlled so that the two inter-polarization effective optical path lengths become identical with each other, so that the accumulation of the optical signal bit error is preventable.

(b) Description of Second Embodiment

FIG. 5 illustratively shows a structure of an optical device according to a second embodiment of this invention. In a similar way, an optical device 20 is constructed such that an optical waveguide assembly 22 is formed on a substrate 21 having a double refraction whereby an optical signal can propagate through the optical waveguide assembly 22.

The substrate 21 shows a double refraction, and for example, is made using a lithium niobate substrate (X-cut $LiNbO_3$) where the crystal structure is cut in the X-axial direction.

On the other hand, the optical waveguide assembly 22 is formed by diffusing a metal such as titanium (Ti) into the substrate 21, and is composed of an input optical waveguide 22-1 for receiving an optical signal, a polarization separating section 23*a* for separating the polarization condition of the optical signal inputted, two paths 24*a*, 24*b* for wave-guiding the optical signals polarization-separated in the polarization separating section 23*a*, a multiplexing section 23*b* for again multiplexing the two optical signals wave-guided through the paths 24*a*, 24*b*, and output optical waveguides 22-3, 22-4 for outputting the optical signals.

In addition, on the surface of the substrate 21, a transducer 25 is formed at a position corresponding to the positions of the paths 24*a*, 24*b* in the vicinity of the polarization separating section 23*a*. The transducer 25 for generating elastic surface waves is formed by depositing a metal such as gold (Au) on the substrate 21, and is equipped with a pair of comb-like electrodes 26, 27 for generating elastic surface waves.

That is, the optical device 20 functions as an acoustooptic (acousto-optical) tunable wavelength filter which conducts a mode-conversion of only an optical signal with a desired wavelength of an optical signal comprising optical signals with a plurality of wavelengths under the acoustooptic effect achievable owing to the elastic surface wave generated from the transducer 25.

In this instance, the optical device 20 according to the second embodiment is made so that, in order to equalize the two inter-polarization effective optical path lengths for an optical signal when the optical signal propagates through the optical waveguide assembly 22, one path 24*a* being one of the two paths 24*a*, 24*b*, which is made to wave-guide the optical signal (TM mode optical signal) with a smaller refractive index of the two optical signals polarization-separated is designed to be longer than the other path 24*b*.

In other words, in order to make the two inter-polarization effective optical path lengths for the optical signal become equal to each other, the lengths of the two paths 24*a*, 24*b* are set to meet the conditions of the following equation (4). In the following equation (4), the effective refractive indexes of the substrate 21 for the TE mode light and the TM mode light are respectively taken to be $n_{1(TE)}$, $n_{1(TM)}$ ($n_{1(TE)} > n_{1(TM)}$) and the lengths of the two paths 24*a*, 24*b* are respectively taken as f, g.

$$n_{1(TM)} \cdot f = n_{1(TE)} \cdot g \therefore f > g \quad (4)$$

With the above-described structure, in the optical device 20 according to the second embodiment of this invention, when an optical signal comprising optical signals with a plurality of wavelengths is inputted to the input optical waveguide 22-1 of the optical waveguide assembly 22, the polarization condition of the optical signal inputted is separated in the polarization separating section 23*a*. Further, in the polarization separating section 23*a*, the TE mode optical signal is reflected to be inputted to the path 24*a* while the TM mode optical signal passes to be inputted to the path 24*b*, so that the TE mode optical signal propagates in the path 24*a* whereas the TM mode optical signal propagates in the path 24*b*.

At this time, owing to the acoustooptic effect producible by the elastic surface wave from the transducer 25, of the respective mode optical signals including optical signals with a plurality of wavelengths, the polarization components of an optical signal with a desired wavelength (an optical signal with a wavelength determined from the period of the elastic surface wave) rotate by 90 degrees, so that the optical signal with that wavelength is subjected to the mode conversion.

Accordingly, of the optical signal with the desired wavelength, the TE mode optical signal inputted to the path 24*a* is converted into the TM mode whereas the TM mode optical signal inputted to the path 24*b* is converted into the TE mode, and then propagate in the paths 24*a*, 24*b*, respectively.

Incidentally, in the case of the optical signals with the other wavelengths not undergoing the mode conversion, their polarization components do not rotate, so that they directly propagate in the paths 24*a*, 24*b*.

Moreover, the two optical signals wave-guided through the paths 24*a*, 24*b* are again multiplexed in the multiplexing section 23*b*, and the optical signal with the desired wavelength mode-converted is outputted to the output optical waveguide 22-4, whereas the optical signal with the other wavelength, not subjected to the mode conversion, is outputted to the output optical waveguide 22-3.

That is, of the optical signal with the desired wavelength, the TM mode optical signal wave-guided through the path 24*a* moves on to be outputted to the output optical waveguide 22-4 while the TE mode optical signal wave-guided through the path 24*b* reflects to be outputted to the output optical waveguide 22-4, thus accomplishing the multiplexing of the two optical signals wave-guided through the paths 24*a*, 24*b*.

In the case of the optical signals with the other wavelengths, the TE mode optical signal wave-guided through the path 24*a* reflects to be outputted to the output waveguide 22-3 while the TM mode optical signal wave-guided through the path 24*b* moves on to be outputted to the output optical waveguide 22-3, whereupon the two optical signals wave-guided through the paths 24*a*, 24*b* are multiplexed.

In this instance, since the lengths of the paths 24*a*, 24*b* are set so that the two inter-polarization effective optical path lengths become equal to each other, it is possible to reduce the bit errors of the optical signals occurring at the propagation of the optical signals in the two paths 24*a*, 24*b* each having a double refraction, with the result that the demultiplexing of the optical signals can be done with a high performance.

As described above, in the optical device 20 according to the second embodiment of this invention, in order to equalize the two inter-polarization effective optical path lengths for the optical signal, one path for wave-guiding the optical signal with a smaller refractive index of the two polarization-separated optical signals is made to be longer than the other path, whereupon it is possible to reduce the optical signal bit error occurring in the case of the input of an optical signal (high-speed optical signal) with a high bit rate, which can enhance the communication accuracy of the optical communication system working for the transmission of the high-speed optical signals.

(b1) Description of Modification of Second Embodiment

Figure 6:
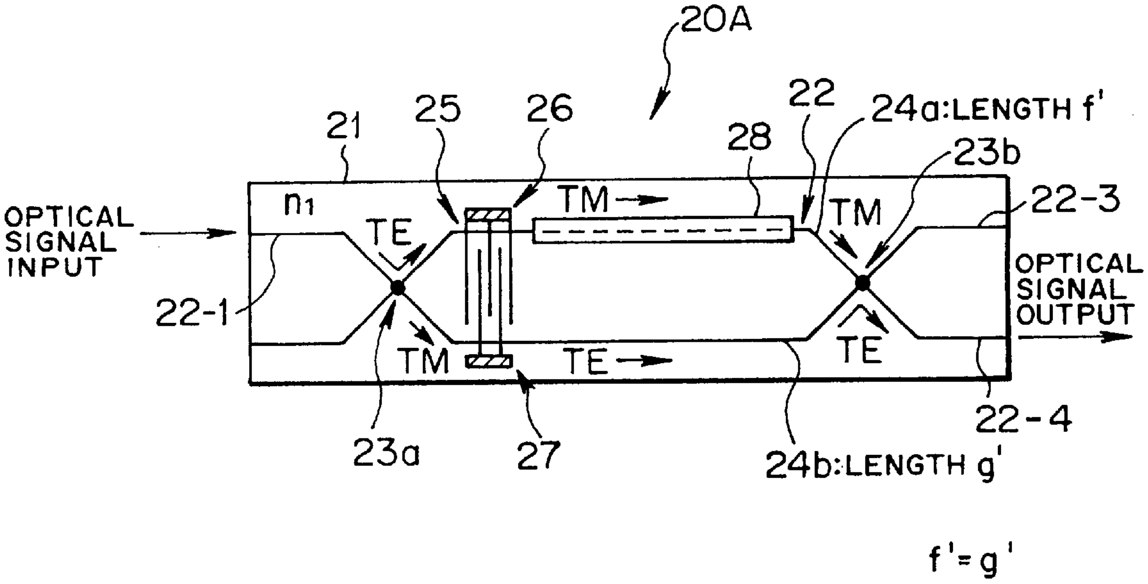
FIG. 6 illustratively shows a construction of an optical device according to a modification of the second embodiment of this invention.

FIG. 6 illustratively shows a structure of an optical device according to a modification of the second embodiment of this invention. Likewise, an optical device 20A shown in FIG. 6 is made such that an optical waveguide assembly 22 is formed on a substrate 21 having a double refraction and the optical waveguide assembly 22 permits the propagation of an optical signal.

The substrate 21 and a transducer 25 are the same as those in the above-described second embodiment.

Furthermore, as compared with the second embodiment, the optical waveguide assembly 22 in this modification differs therefrom in that two paths 24*a*, 24*b* have the same length, but the other components are basically the same.

Still further, at least a partial area of one (the path 24*a* in FIG. 6) of the two paths 24*a*, 24*b* is formed with a buffer layer 28 differing from the other path.

The optical waveguide assembly 22 is made by diffusing a metal such as titanium (Ti) into the substrate 21 while the buffer layer 28 is made with a thin film formed by depositing, for example, alumina ($Al_2O_3$) or the like.

In this case, the optical device 20A is designed so that, although the paths 24*a*, 24*b* have the same length (that is, when the length of the path 24*a* is taken as f' and the length of the path 24*b* is taken as g', f'=g'), the buffer layer 28 is formed on only the path 24*a* to cause the refractive index of the path 24*a* to be larger than the refractive index of the path 24*b*, thereby making the two inter-polarization effective optical path lengths become equal to each other (to satisfy the above-mentioned equation (4)).

A brief description of this optical device 20A is that, in order to make the two inter-polarization effective optical path lengths become identical with each other, the buffer layer 28 is placed on at least a partial area of one (the path 24*a* in FIG. 6) of the two paths 24*a*, 24*b* unlike the other path.

With this construction, in the optical device 20A according to the modification of the second embodiment of this invention, as well as the above-described optical device 20 according to the second embodiment, when an optical signal comprising optical signals with a plurality of wavelengths is inputted to an input optical waveguide 22-1 of the optical waveguide assembly 22, the polarization condition of the optical signal inputted is separated in a polarization separating section 23*a* so that the respective mode optical signals propagate through the paths 24*a*, 24*b*, respectively.

In the paths 24*a*, 24*b*, of the respective mode optical signals having the optical signals with a plurality of wavelengths, the optical signal with a desired wavelength (an optical signal with a wavelength determined by the period of the elastic surface wave) undergoes the mode conversion.

Furthermore, the two optical signals wave-guided through the paths 24*a*, 24*b* are again multiplexed in a multiplexing section 23*b*, and the optical signal with the desired wavelength mode-converted is outputted to an output optical waveguide 22-4 whereas the optical signal with the other wavelength, not subjected to the mode conversion, is outputted to an output optical waveguide 22-3.

In this instance, the buffer layer 28 is formed on the path 24*a* to make the two inter-polarization effective optical lengths become identical with each other, thereby accomplishing the reduction of the optical signal bit errors occurring at the propagation of the optical signals in the two paths 24*a*, 24*b* each having a double refraction, with the result that the high-performance optical signal demultiplexing becomes possible.

As described above, in the optical device 20A according to the modification of the second embodiment of this invention, in order to equalize the two inter-polarization effective optical path lengths for the optical signal, at least a partial area of one path is constructed with the buffer layer unlike the other path, so that the same advantages as those of the optical device 20 according to the second embodiment are obtainable.

Although the above description has been made in the case that the buffer layer 28 is formed on only the path 24*a* to cause the refractive index of the path 24*a* to be higher than that of the path 24*b*, it is also appropriate that the optical waveguide assembly 22 is constructed so that the width of the path 24*a* is larger than that of the path 24*b* or the optical waveguide assembly 22 is made by mixing more dopant in a portion for the formation of the path 24*a* as compared with a portion for the formation of the path 24*b* to cause the refractive index of the path 24*a* to exceed that of the path 24*b*. In this case, the optical device manufacturing processes become simplified.

(c) Description of Third Embodiment

Figure 7:
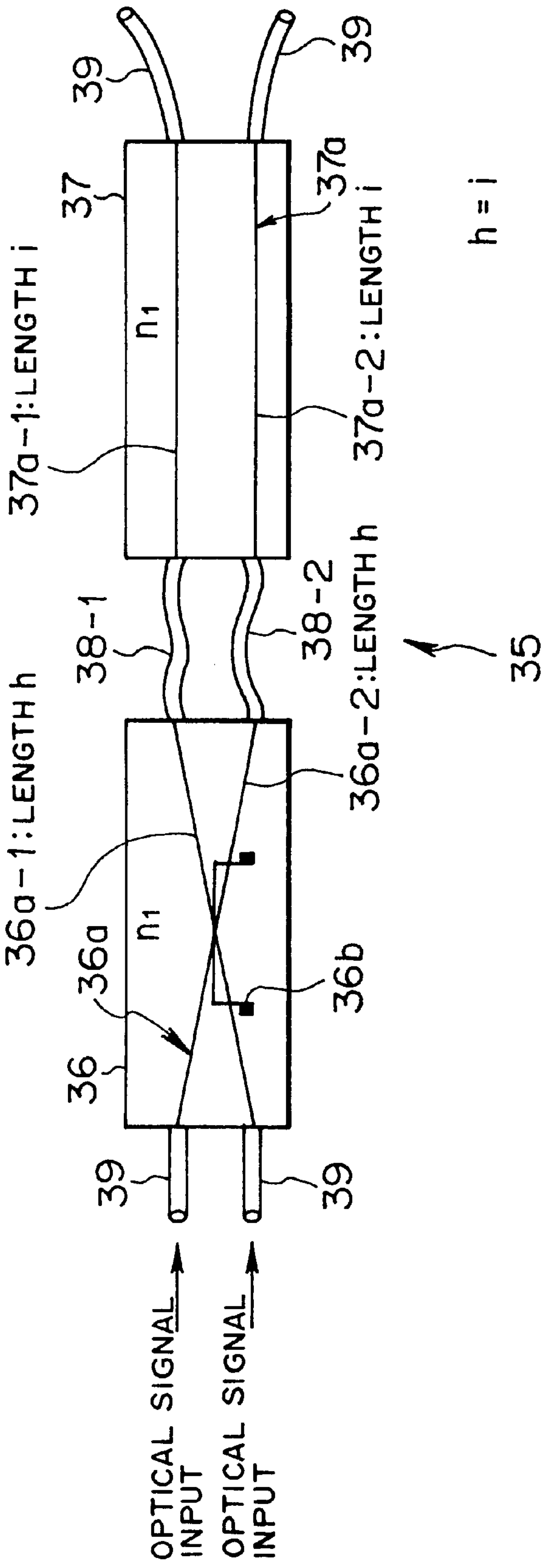
FIG. 7 illustratively shows a construction of an optical device according to a third embodiment of this invention.

FIG. 7 illustratively shows a structure of an optical device according to a third embodiment of this invention. An optical device 35 shown in FIG. 7 is equipped with a plurality of substrates 36, 37 having the same double refraction, with optical waveguide assemblies 36*a*, 37*a* being formed on the substrates 36, 37, respectively, while the optical waveguide assemblies 36*a*, 37*a* being coupled through polarization maintaining fibers 38-1, 38-2 in series to each other so that optical signals propagate through these optical waveguide assemblies 36*a*, 37*a*. The optical device 35 serves as an optical switch.

The optical waveguide assembly (crossing type optical waveguide) 36*a* on the substrate 36 is formed such that two straight optical waveguides 36*a*-1, 36*a*-2 having the same length intersect with each other at a central position, whereas the optical waveguide assembly (parallel type optical waveguide) 37*a* on the substrate 37 is made such that two straight optical waveguides 37*a*-1, 37*a*-2 having the same length are formed to be parallel to each other.

In addition, on the substrate 36, there is formed an electrode section 36*b* which gives an electric potential for conducting the switching control of optical signals propagating in the optical waveguide assembly 36*a* at the crossing position in the optical waveguide assembly 36*a*. In other words, the substrate 36 corresponds to an optical switch section for performing the switching operation for the optical signals.

The optical waveguide assemblies 36*a*, 37*a* are formed by diffusing a metal such as titanium (Ti) into the substrates 36, 37, whereas the electrode section 36*b* is formed by depicting a metal such as gold (Au) on the substrate 36.

Furthermore, in FIG. 7, numeral 39 represents optical fibers for permitting the propagation of optical signals.

In this construction, the substrates 36, 37 are made to have the same double refraction, and is made, for example, with a lithium niobate substrate (X-cut $LiNbO_3$).

Still further, the polarization maintaining fibers 38-1, 38-2 are capable of maintaining the polarization conditions of optical signals, and in the optical device 35 according to the third embodiment, for converting the polarization conditions of the optical signals propagating in the polarization maintaining fibers 38-1, 38-2, the respective polarization maintaining fibers 38-1, 38-2 are connected to the two double refraction optical waveguide assemblies 36*a*, 37*a* showing the same double refraction characteristic due to the polarization in a state of being twisted by 90 degrees.

In this case, in the optical device 35 according to the third embodiment, in order to equalize the two inter-polarization effective optical path lengths for an optical signal when optical signals respectively propagate through the optical waveguide assemblies 36*a*, 37*a*, the lengths of the optical waveguide assemblies 36*a*, 37*a* are set to satisfy the conditions of the following equation (5). In the following equation (5), the effective refractive indexes of the substrate 21 for the TE mode light and the TM mode light are respectively taken to be $n_{1(TE)}$, $n_{1(TM)}$($n_{1(TE)}$>$n_{1(TM)}$), the lengths of the straight optical waveguides 36*a*-1, 36*a*-2 are respectively taken as h, and the lengths of the straight optical waveguides 37*a*-1, 37*a*-2 are respectively taken as i.

$$n_{1(TE)}\cdot h+n_{1(TM)}\cdot i=n_{1(TM)}\cdot h+n_{1(TE)}\cdot i \therefore h=i \quad (5)$$

More specifically, in order to equalize the two inter-polarization effective optical paths for the optical signal, in this optical device 35, the substrates 36, 37 having the same double refraction are provided and the straight optical waveguides 36*a*-1, 36*a*-2 and 37*a*-1, 37*a*-2 having the same length are placed on the substrates 36, 37, respectively, while the optical waveguide assemblies 36*a*, 37*a* on the substrates 36, 37 are coupled in series to each other in a state where the polarization maintaining fibers 38-1, 38-2 for converting polarization conditions of optical signals are interposed therebetween, and further the double refractions of the optical waveguide assemblies 36*a*, 37*a* on the substrates 36, 37 and the polarization maintaining fibers 38-1, 38-2 are offset as a whole.

With the above-described construction, in the optical device 35 according to the third embodiment of this invention, when two kinds of optical signals are inputted through input side optical fibers 39 to the straight optical waveguides 36*a*-1, 36*a*-2 of the optical waveguide assembly 36*a*, the switching between the optical signals propagating in the optical waveguide assembly 36*a* is done in accordance with the optical signal switching control by the electrode section 36*b*. For instance, the optical signal inputted to the straight optical waveguide 36*a*-1 is inputted to the polarization maintaining fiber 38-1 whereas the optical signal inputted to the straight optical waveguide 36*a*-2 is inputted to the polarization maintaining fiber 38-2.

Since the optical signal bit error takes place between the polarization components of the optical signal when the optical signal propagates in the double refraction optical waveguide assembly 36*a*, the optical signals involving the bit errors are inputted from the optical waveguide assembly 36*a* to the polarization maintaining fibers 38-1, 38-2.

Furthermore, when the optical signals from the optical waveguide assembly 36*a* propagate through the polarization maintaining fibers 38-1, 38-2, their polarization components rotate by 90 degrees to get into the mode converted conditions (that is, the TE mode optical signal component of the optical signal is converted into the TM mode optical signal component, while the TM mode optical signal component is converted into the TE mode optical signal component), and subsequently, the optical signals are outputted to the optical waveguides 37*a*-1, 37*a*-2 of the optical waveguide assembly 37*a* coupled to the polarization maintaining fibers 38-1, 38-2.

In this case, since the lengths of the straight optical waveguides 36*a*-1, 36*a*-2, 37*a*-1, 37*a*-2 are determined so that the two inter-polarization effective optical path lengths become equal to each other, while the optical signals propagate in the double refraction optical waveguide assembly 37*a*, the optical signal bit errors occurring at the propagation in the optical waveguide assembly 36*a* decrease, thus achieving the optical signal switching operation with a high performance.

Besides, the optical signals passing through the optical waveguide assembly 37*a* are outputted through output side optical fibers 39.

As described above, in the optical device 35 according to the third embodiment, with a view to equalizing the two inter-polarization effective optical path lengths for the optical signal, the double refractions of the optical waveguide assemblies 36*a*, 37*a* on the substrates 36, 37 and the polarization maintaining fibers 38-1, 38-2 are offset as a whole, with the result that it is possible to decrease the optical signal bit error occurring at the input of an optical signal (high-speed optical signal) with a high bit rate, which enhances the communication accuracy of an optical communication system for the transmission of the high-speed optical signals.

In addition, as mentioned before, in the case of constructing an optical communication system by connecting a large number of optical communication elements each showing a double refraction, if the optical communication elements are managed and connected so that the two inter-polarization effective optical path lengths become identical with each other, the optical signal bit error is reducible. Particularly, when the optical communication elements are coupled through the polarization maintaining fibers twisted by 90 degrees to each other like the structure of the third embodiment, the polarization directions can easily be set, and therefore, it is possible to easily construct an optical communication system where the two inter-polarization effective optical path lengths are identical with each other.

(c1) Description of Modification of Third Embodiment

Figure 8:
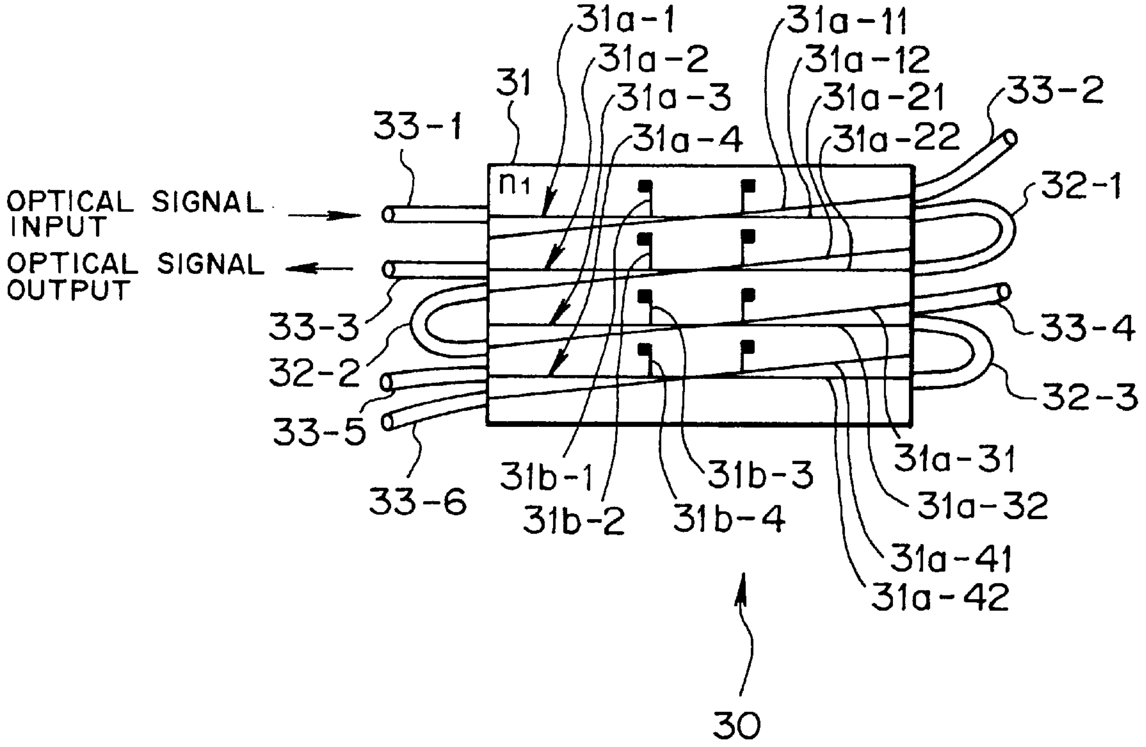
FIG. 8 illustratively shows a construction of an optical device according to a modification of the third embodiment of this invention.

FIG. 8 illustratively shows a construction of an optical device according to a modification of the third embodiment of this invention. In comparison with the above-described third embodiment, an optical device 30 shown in FIG. 8 is similar thereto in that polarization maintaining fibers twisted by 90 degrees are used to equalize the two inter-polarization effective optical path lengths for an optical signal, but differs therefrom in that the polarization maintaining fibers twisted by 90 degrees are coupled among a plurality of optical waveguides formed on the same substrate.

On a substrate 31 there are formed four optical waveguide assemblies (crossing type optical waveguides) 31*a*-1 to 31*a*-4. These optical waveguide assemblies 31*a*-1 to 31*a*-4 have the substantially same function as the optical waveguide assembly (see numeral 2*a*) in the above-described first embodiment.

Numeral 33-1 stands for an optical fiber which serves as an input optical fiber for introducing an optical signal into the optical device 30, and which is coupled to one end portion of a straight optical waveguide 31*a*-12 organizing the optical waveguide assembly 31*a*-1.

The optical fibers 33-2 to 33-6 act as output optical fibers for outputting optical signals from the optical device 30, and as well as the above-mentioned optical fibers, the optical fiber 33-2 is coupled to the other end portion of the straight optical waveguide 31*a*-11 constituting the optical waveguide assembly 31 *a*-1 while the optical fiber 33-3 is connected to one end portion of a straight optical waveguide 31*a*-22 composing the optical waveguide assembly 31*a*-2.

Furthermore, the optical fiber 33-4 is coupled to the other end portion of a straight optical waveguide 31*a*-31 constituting the optical waveguide assembly 31*a*-3; the optical fiber 33-5 is connected to one end portion of a straight optical waveguide 31*a*-42 constituting the optical waveguide assembly 31*a*-4; and the optical fiber 33-6 is connected to one end portion of a straight optical waveguide 31*a*-41 organizing the optical waveguide assembly 31*a*-4.

Moreover, numerals 32-1 to 32-3 depict polarization maintaining fibers twisted by 90 degrees, which are for the purpose of conducting the mode conversion of an optical signal inputted.

The polarization maintaining fiber 32-1 is for establishing a connection between the other end portion of the straight optical waveguide 31*a*-12 and the other end portion of the straight optical waveguide 31*a*-22, the polarization maintaining fiber 32-2 makes a connection between one end portion of the straight optical waveguide 31*a*-21 and one end portion of the straight optical waveguide 31*a*-31, and the polarization maintaining fiber 32-3 makes a connection between the other end portion of the straight optical waveguide 31*a*-32 and the other end portion of the straight optical waveguide 31*a*-42.

In addition, electrode sections 31*b*-1 to 31*b*-4 substantially similar to those in the above-described first embodiment are formed at the intersecting positions of the optical waveguide assemblies 31*a*-1 to 31*a*-4 on the substrate 31.

Thus, the optical device 30 serves as optical switches in which, when an optical signal is inputted from the optical fiber 33-1, in a manner that the voltages to be given to the electrode sections 31*b*-1 to 31*b*-4 are controlled in a state where the two inter-polarization effective optical path lengths are set to be equal to each other, the optical signal is outputted from one of 5 output optical fibers 33-2 to 33-6.

That is, the optical device 30 functions as an optical switch array in which a plurality of pairs of optical switch sections each comprising an optical waveguide assembly 31*a*-1 (i=1 to 4) and an electrode section 31*b*-1 are integrated on the same substrate.

The substrate 31 has a double refraction, and is formed with, for example, a lithium niobate substrate (X-cut $LiNbO_3$) .

Furthermore, the polarization maintaining fibers 32-1 to 32-3 are capable of maintaining the polarization conditions of optical signals, and in the optical device 30 according to the modification of the third embodiment, for the conversion of the polarization conditions of the optical signals propagating in the polarization maintaining fibers 32-1 to 32-3, the polarization maintaining fibers 32-1 to 32-3 establish the connection among the optical waveguides 31*a* in the plurality of pairs of optical switch sections in a state of being twisted by 90 degrees.

In the optical device 30 according to the modification of the third embodiment, in order to make the two inter-polarization effective optical path lengths become identical with each other, the plurality of optical waveguides 31*a*-11 to 31*a*-42 having the same length are formed on the same substrate 31 showing a double refraction, and are coupled to each other through the polarization maintaining fibers 32-1 to 32-3 capable of maintaining the polarization conditions of the optical signals, and further the double refractions of the plurality of optical waveguides 31*a*-11 to 31*a*-42 and the polarization maintaining fibers 32-1 to 32-3 are offset as a whole.

In other words, in the optical device 30, the respective optical waveguides 31*a*-11 to 31*a*-42 are made to have the same length, and are coupled to each other through the polarization maintaining fibers 32-1 to 32-3 twisted by 90 degrees, and further the double refractions of the plurality of optical waveguides 31*a*-11 to 31*a*-42 and the polarization maintaining fibers 32-1 to 32-3 are offset as a whole.

With the above-described construction, in the optical device 30 according to the modification of the third embodiment of this invention, when an optical signal is inputted through the input side optical fiber 33-1 to the optical waveguide 31*a*-11 of the optical waveguide assembly 31*a*-1, the switching operation for the optical signal propagating in the optical waveguide 31*a*-1 is conducted under the optical signal switching control by the electrode section 31*b*-1.

While the optical signal propagates in the double refraction optical waveguide 31*a*-11, the optical signal bit error takes place between the polarization components of the optical signal, with the result that the optical signal being in the bit error condition is inputted from the optical waveguide 31*a*-11 to the polarization maintaining fiber 32-1.

In addition, while the optical signal inputted from the optical waveguide 31*a*-11 propagates in the polarization maintaining fiber 32-1, its polarization components rotate 90 degrees to come into the mode converted conditions (that is, the TE mode optical signal component of the optical signal is converted into the TM mode optical signal component whereas the TM mode optical signal component is converted into the TE mode optical signal component), and subsequently, the optical signal is outputted to the optical waveguide 31*a*-22 of the other optical waveguide assembly 31*a*-2 connected to the polarization maintaining fiber 32-1.

In this instance, since each of the optical waveguides 31*a*-11, 31*a*-22 has a length whereby the two inter-polarization effective optical path lengths become identical with each other, the optical signal bit error occurring at the propagation of the optical signal in the optical waveguide 31*a*-11 is reducible, thus accomplishing the optical signal switching operation with a high performance.

In this optical device 30, as well as in the above description, the optical signal switching operations are successively done in the respective optical switch sections, and the optical signals propagating in the optical waveguides 31*a*-11, 31*a*-22, 31*a*-31, 31*a*-41 and 31*a*-42 are outputted through the corresponding output side optical fibers 33-2 to 33-6, respectively.

As described above, in the optical device 30 according to the modification of the third embodiment of this invention, in order to equalize the two inter-polarization effective optical path lengths for the optical signal, the double refractions of the plurality of optical waveguides 31*a*-11 to 31*a*-42 and the polarization maintaining fibers 32-1 to 32-3 are offset as a whole, which allows the decrease in the optical signal bit error occurring at the input of a high-speed optical signal, thereby leading to the improvement of the communication accuracy of an optical communication system for the transmission of the high-speed optical signal.

(d) Description of Fourth Embodiment

Figure 9:
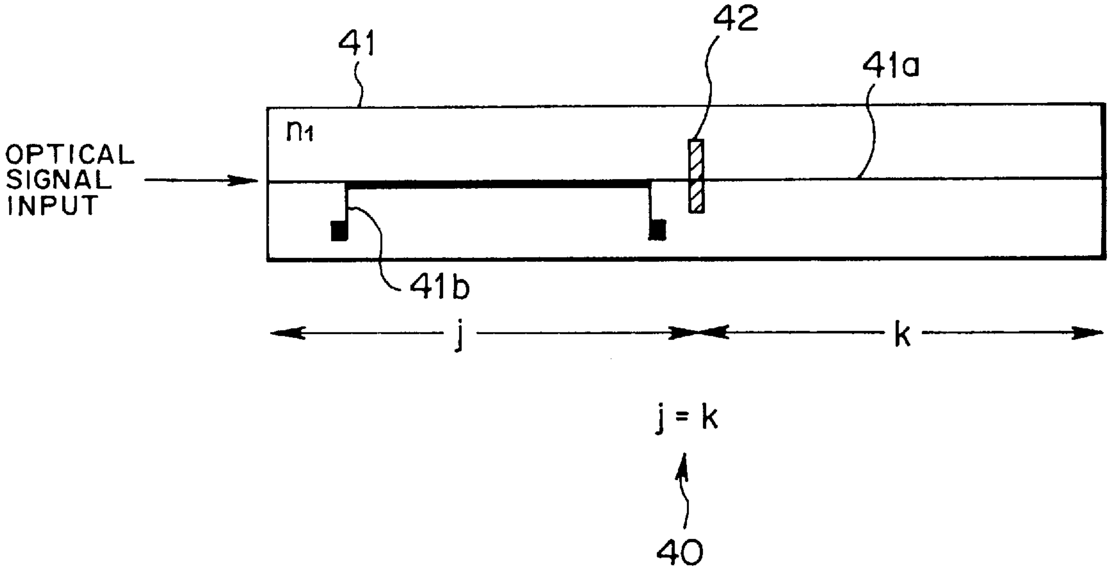
FIG. 9 illustratively shows a construction of an optical device according to a fourth embodiment of this invention.

FIG. 9 illustratively shows a structure of an optical device according to a fourth embodiment of this invention. An optical device 40 shown in FIG. 9 is constructed such that an optical waveguide 41*a* is formed on a substrate 41 having a double refraction to allow an optical signal to propagate through the optical waveguide 41*a*, and functions as a phase modulator which conducts the phase modulation of the optical signal.

In this optical device 40, at least one optical waveguide 41*a* is formed on the substrate 41 having a double refraction and a polarization condition converting element 42 for converting the polarization conditions of optical signals is placed at a middle position of the optical waveguide 41*a*.

In addition, at a central portion of an input side area of the polarization condition converting element 42 and at a position corresponding to an upper position of the optical waveguide 41*a* on the surface of the substrate 41, there is formed an electrode section 41*b* which supplies an electric potential for the phase modulation of an optical signal propagating in the optical waveguide 41*a*.

The optical waveguide 41 a is formed by diffusing a metal such as titanium (Ti) into the substrate 41, whereas the electrode section 41*b* is formed by depositing a metal such as gold (Au) on the substrate 41.

The input side area of the polarization condition converting element 42 on the substrate 41 is equivalent to a phase modulating section for conducting the phase modulation of an optical signal.

The polarization condition converting element 42 is formed in a manner that a half-wave plate is located in a state of being inclined by 45 degrees (that is, the axial direction of the half-wave plate is set to be inclined by 45 degrees with respect to the respective polarization waves of an optical signal) to perform mode conversion of the optical signals inputted. That is, the TE mode optical signal component of the optical signal is converted into the TM mode optical signal component while the TM mode optical signal component is converted into the TE mode optical signal component.

Furthermore, in the optical device 40 according to the fourth embodiment, in order to equalize the two inter-polarization effective optical path lengths for an optical signal when the optical signal propagates in the optical waveguide 41*a*, the polarization condition converting element 42 is situated at a position satisfying the following equation (6) (that is, at an intermediate position of the optical waveguide 41*a*). In the following equation (6), the effective refractive indexes of the substrate 41 for the TE mode light and the TM mode light are respectively taken to be $n_{1(TE)}$, $n_{1(TM)}$ ($n_{1(TE)} > n_{1(TM)}$), and the length of the optical waveguide 41*a* from the input side end surface of the substrate 41 to the polarization condition converting element 42 and the length of the optical waveguide 41*a* from the polarization condition converting element 42 to the output side end surface of the substrate 41 are respectively taken as j, k.

$$n_{1(TE)} \cdot j + n_{1(TM)} \cdot k = n_{1(TM)} \cdot j + n_{1(TE)} \cdot k \therefore j = k \tag{6}$$

That is, if the polarization condition of the optical signal is converted, the double refraction characteristics due to the polarization become contrary to each other (the double refractive indexes for the TE mode light and the TM mode light become upside down in magnitude), so that the two inter-polarization effective optical path lengths become identical with each other.

With this construction, in the optical device 40 according to the fourth embodiment of this invention, when an optical signal is inputted to the optical waveguide 41*a*, the phase modulation of the optical signal is made in accordance with an electric potential from the electrode section 41*b*.

Since the optical signal bit error takes place between the polarization components of the optical signal when propagating in the double refraction optical waveguide 41*a*, the optical signal being in the bit error included condition is inputted from the optical waveguide 41*a* to the polarization condition converting element 42.

In the polarization condition converting element 42, the TE mode optical signal component of the optical signal is converted into the TM mode optical signal component, whereas the TM mode optical signal component is converted into the TE mode optical signal component, and the optical signal mode-converted is outputted to the optical waveguide 41*a* on the output side of the polarization condition converting element 42.

Since the polarization condition converting element 42 is placed at the intermediate position of the optical waveguide 41*a*, the optical signal bit error occurring at the propagation in the optical waveguide 41*a* on the input side of the polarization condition converting element 42 is reducible, which can ensure the high-performance phase modulation for the optical signal.

As described above, in the optical device 40 according to the fourth embodiment of this invention, in order to equalize the two inter-polarization effective optical path lengths for the optical signal, the polarization condition converting element 42 is located at the intermediate position of the optical waveguide 41*a*, which can accomplish the reduction of the optical signal bit error taking place at the input of an optical signal (high-speed optical signal) with a high bit rate, with the result that the communication accuracy of an optical communication system for the transmission of the high-speed optical signal is improvable.

(d1) Description of Fourth Embodiment

Figure 10:
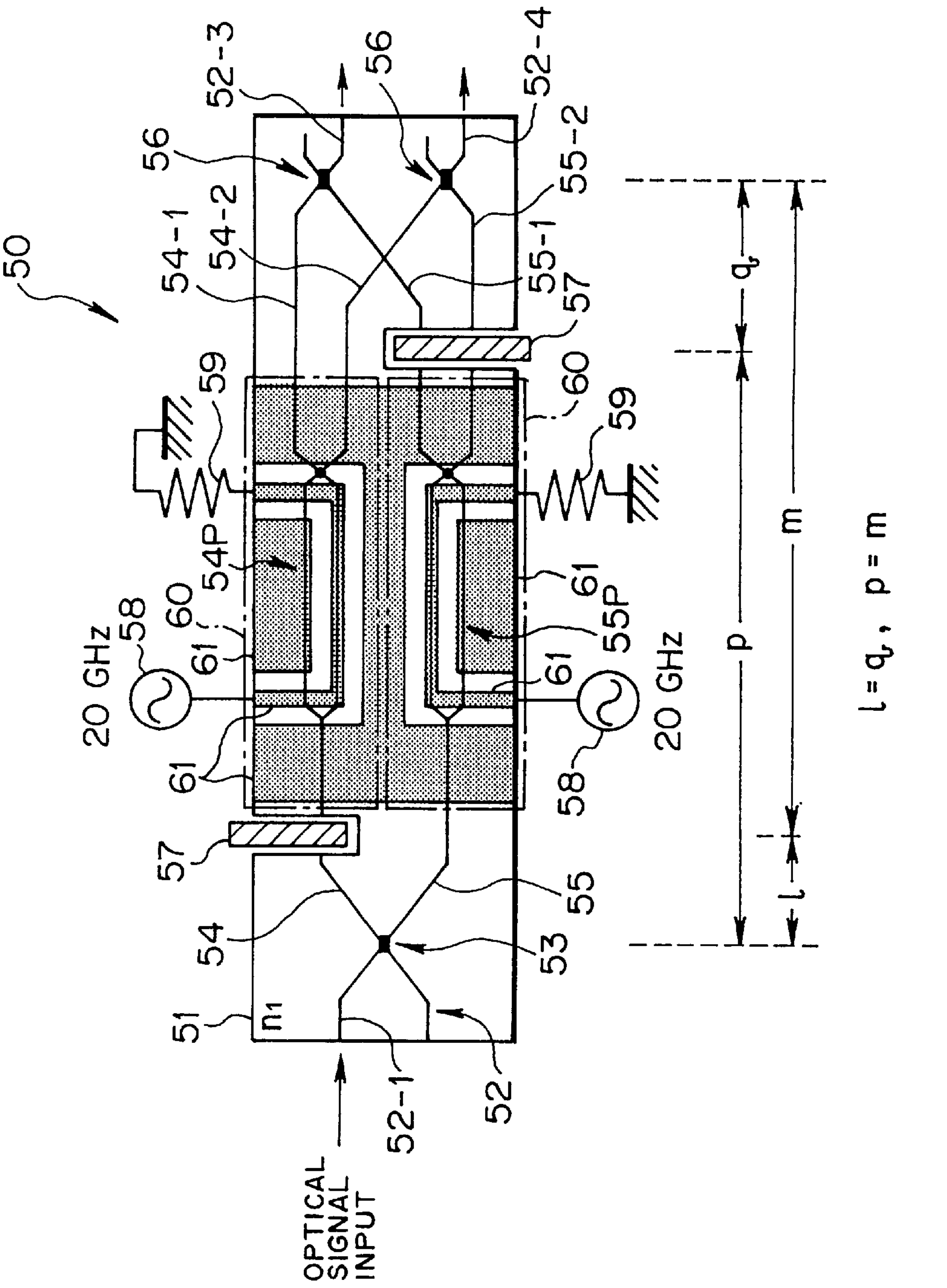
FIG. 10 illustratively shows a construction of an optical device according to a modification of the fourth embodiment of this invention.
Figure 11:
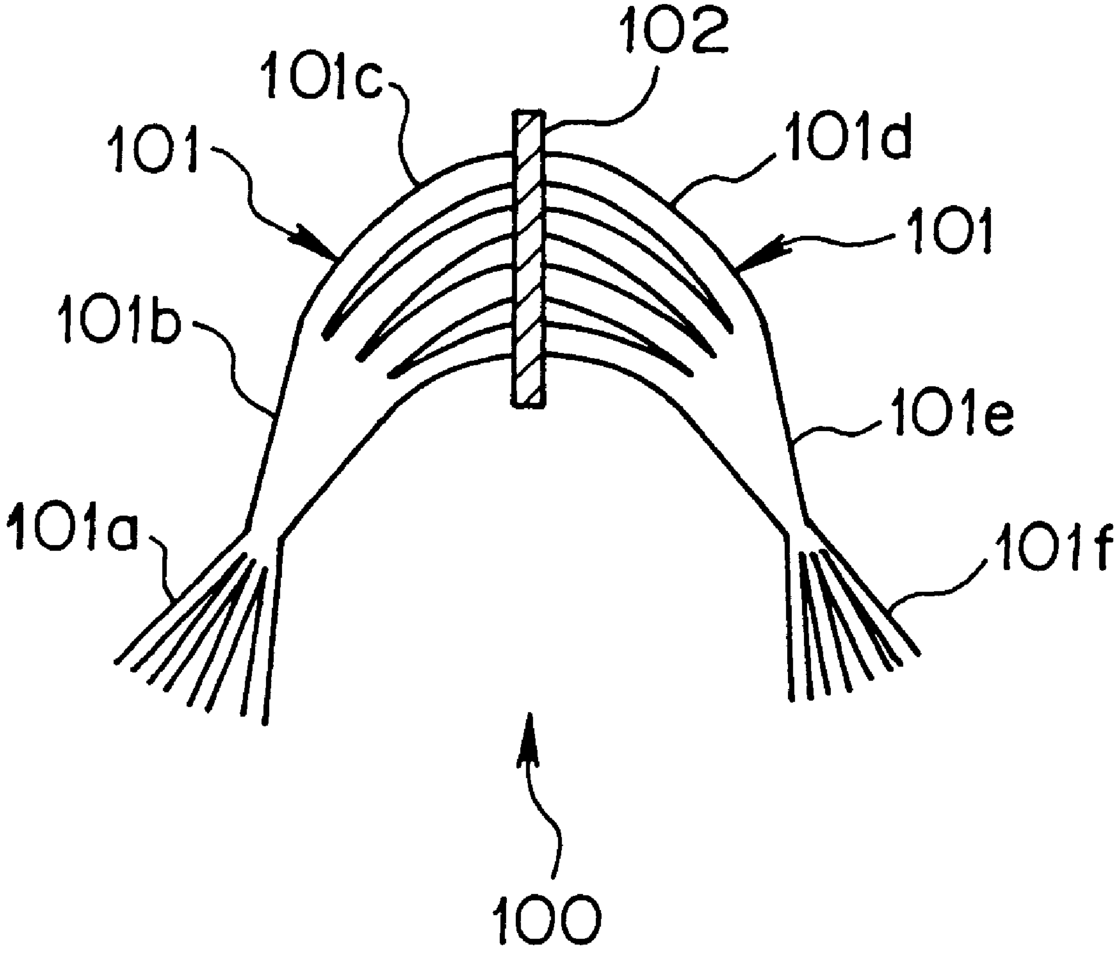
FIG. 11 illustratively shows a structure of an optical device in the related art.

FIG. 10 illustratively shows a construction of an optical device according to a modification of the fourth embodiment of this invention. An optical device 50 shown in FIG. 10 is made such that an optical waveguide assembly 52 is formed on a substrate 51 having a double refraction to permit an optical signal to propagate in the optical waveguide assembly 52, and serves as an integrated optical time-division demultiplexer for conducting the time-division separation of the optical signal.

That is, for example, this optical device 50 is for the purpose of separating an optical signal (time-division multiplexed optical signal), which is made by multiplexing two light components each data-modulated in an optical signal time-division multiplexer (not shown) provided on the optical signal transmission side, into the original data (the two light components data-modulated).

The substrate 51 is made to have a double refraction, and is made, for example, with a lithium niobate substrate (Z-cut $LiNbO_3$) where the crystal structure is cut in the Z-axial direction.

Furthermore, the optical waveguide assembly 52 is formed by diffusing a metal such as titanium (Ti) into the substrate 51, and is composed of an input optical waveguide 52-1 for the input of an optical signal (time-division multiplexed optical signal) from the internal, a polarization separating section 53 for separating the polarization condition of the optical signal inputted, two paths 54, 55 for wave-guiding the optical signals polarization-separated in the polarization separating section 53, two multiplexing sections 56 for again multiplexing the two optical signals wave-guided through the paths 54, 55, and output optical waveguides 52-3, 52-4 for the output of the optical signals. The polarization separating section 53 is constructed with a 3 dB coupler of a 2×2 structure.

In addition, the optical signals advancing through the paths 54, 55 pass through Mach-Zehnder type optical waveguides 54P, 55P existing at central portions of the substrate 51. Further, an output side optical waveguide of each of the optical waveguides 54P, 55P is branched into two. A set of a branched path 54-1 from the optical waveguide 54P and a branched path 55-1 from the optical waveguide 55P and a set of a branched path 54-2 from the optical waveguide 54P and a branched path 55-2 from the optical waveguide 55P are joined to each other at the multiplexing sections 56, respectively. Thus, the time-division multiplexed optical signal inputted is separated into two optical signals having the original data components before the time-division multiplexing which in turn, are outputted from the output optical waveguides 52-3, 52-4, respectively.

Moreover, at positions corresponding to the optical waveguides 54P, 55P on the surface of the substrate 51, there are formed electrode sections 61 for giving electric potentials for the time-division separation of optical signals propagating in the optical waveguides 54P, 55P.

Furthermore, in the optical device 50, two balanced bridge type switches 60 are made by the optical waveguides 54P, 55P and the electrode sections 61. In each of the balanced bridge type switches 60, to the electrode section 61 there are connected an input signal power supply 58 and a terminal resistor 59.

That is, the balanced bridge type switches 60 are an optical switch not depending upon the polarization. For example, when an optical signal with a transmission speed of 40 Gb/s is inputted, the balanced bridge type switches 60 perform the time-division separation into optical signals of 20 Gb/s.

In the diffusion processing for forming the optical waveguide assembly 52, for example, titanium is deposited on the surface of the substrate 51 to make a thickness of approximately 900 Å, and, after patterning, the titanium film is left for about 8 hours in the atmosphere of approximately 1000° C. Further, the width of the pattern of the optical waveguide assembly 52 is about 7 μm, and a single mode optical waveguide is made in the vicinity of the input/output portions of the optical waveguide assembly 52 (that is, the input optical waveguide 52-1 and the output optical waveguides 52-3, 52-4).

Furthermore, the electrode sections 61 are formed by depositing a metal such as gold (Au) on the substrate 51.

Moreover, polarization condition converting elements 57 for converting the polarization conditions of optical signals are put in at the front stage of the optical waveguide 54P and at the rear stage of the optical waveguide 55P, respectively.

The polarization condition converting elements 57 are made in a manner that a half-wave plate is placed in a state of being inclined by 45 degrees as well as the above-mentioned polarization condition converting element 42, and are for performing the mode conversion of the two optical signals polarization-separated by polarization separating section 53, respectively.

In this case, in the optical device 50 according to the modification of the fourth embodiment, the two polarization condition converting elements 57 are located at the positions where the two inter-polarization effective optical path lengths for the optical signal become equal to each other, i.e., at the positions satisfying the following equation (7).

In the following equation (7), the effective refractive indexes of the substrate 51 for the TE mode light and the TM mode light are respectively taken to be $n_{1(TE)}$, $n_{1(TM)}$ ($n_{1(TE)}>n_{1(TM)}$), and the length of the optical waveguide assembly 52 from the polarization separating section 53 to the polarization condition converting element 57 put in the path 54 is taken as 1, the length of the optical waveguide assembly 52 from the polarization condition converting element 57 put in the path 54 to the multiplexing section 56 are taken as m, the length of the optical waveguide assembly 52 from the polarization separating section 53 to the polarization condition converting element 57 put in the path 55 is taken as p, and the length of the optical waveguide assembly 52 from the polarization condition converting element 57 put in the path 55 to the multiplexing section 56 is taken as q. Further, in this case, the two balanced bridge type switches 60 are located in a state of being shifted from each other.

$$n_{1(TE)}\cdot 1+n_{1(TM)}\cdot m=n_{1(TM)}\cdot p+n_{1(TE)}\cdot q \quad n_{1(TE)}(1-q)+n_{1(TM)}(m-p)=0 \therefore 1=q,\ p=m \tag{7}$$

That is, the two polarization condition converting elements 57 are located at positions where the length (1) of the optical waveguide assembly 52 from the polarization separating section 53 to the polarization condition converting element 57 put in the path 54 becomes equal to the length (q) of the optical waveguide assembly 52 from the polarization condition converting element 57 put in the path 55 to the multiplexing section 56 and the length (p) of the optical waveguide assembly 52 from the polarization separating section 53 to the polarization condition converting element 57 put in the path 55 become equal to the length (m) of the optical waveguide assembly 52 from the polarization condition converting element 57 put in the path 54 to the multiplexing section 56.

Accordingly, with the conversion of the polarization condition of an optical signal, their double refraction characteristics due to the polarization can be made to be contrary to each other (that is, the double refraction indexes for the TE mode light and the TM mode light become upside down in magnitude to each other), and the two inter-polarization effective optical path lengths become identical with each other.

Owing to the above-described structure, in the optical device 50 according to the modification of the fourth embodiment of this invention, when a time-division multiplexed optical signal is inputted to the input optical waveguide 52-1 of the optical waveguide assembly 52, the polarization condition of the optical signal is separated in the polarization separating section 53 and, for example, the TE mode optical signal is wave-guided to the path 54 while the TM mode optical signal is wave-guided to the path 55.

Subsequently, the TM mode optical signal wave-guided to the path 54 is mode-converted into the TE mode optical signal in the polarization condition converting element 57 whereas the TE mode optical signal wave-guided to the path 55 remains in that condition, and thereafter, both the optical signals are inputted to the balanced bridge type switches 60, respectively.

In each of the balanced bridge type switches 60, with its switching function, the optical signal whose transmission speed is, for example, 40 Gb/s is time-division-separated into two optical signals of 20 Gb/s which in turn, are outputted therefrom.

The two TM mode optical signals outputted from the balanced bridge type switch 60 on the path 54 are inputted through the two branched paths 54-1, 54-2 to the two multiplexing sections 56, respectively.

On the other hand, the two TM mode optical signals outputted from the balanced bridge type switch 60 on the path 55 are mode-converted into the TE mode optical signals in the polarization condition converting element 57 and then inputted through the two branched paths 55-1, 55-2 to the two multiplexing sections 56, respectively.

At last, in the multiplexing sections 56, the TE mode and TM mode optical signals wave-guided through the paths 54, 55 are again multiplexed, and the multiplexed optical signals are outputted through the output optical waveguides 52-3, 52-4.

In this instance, since the two polarization condition converting elements 57 are provided at the positions (the positions of 1=q and p=m) satisfying the above-mentioned equation (7), the optical signals can propagate in the optical waveguide assembly 52 while the optical signal bit errors decrease, so that the time-division separation of the optical signals is achievable with a high performance.

Thus, in the optical device 50 according to the modification of the fourth embodiment of this invention, the two polarization condition converting elements 57 are located at the positions whereby the two inter-polarization effective optical path lengths for the optical signals become equal to each other, so that the optical signal bit errors occurring at the input of high-speed optical signals are reducible, which can enhance the communication accuracy of an optical communication system for the transmission of high-speed optical signals.

(e) Others

Although, in the description of the first embodiment and the first and third modifications of the first embodiment, the lithium niobate substrates different in crystal cutting direction from each other are used as the two substrates whose double refraction characteristics due to the polarization are contrary to each other, the present invention is not limited to this, and it is also appropriate that substrates made of the other materials other than the lithium niobate are used therefor as long as the double refraction characteristics due to the polarization are contrary to each other.

Furthermore, even in case where the lithium niobate substrates equal in crystal cutting direction to each other are used as the above-mentioned two substrates, if the optical waveguides are formed with the difference between dopants, it is possible to form two double refraction optical waveguides contrary in double refraction characteristic based on the polarization to each other. For instance, if the optical waveguide is formed by the titanium diffusion processing on one substrate and the optical waveguide is formed by the ion exchange processing (for example, the proton exchange processing) on the other substrate, it is possible to form two optical waveguides contrary in double refraction characteristic based on the polarization to each other.

Moreover, although the above description of the respective embodiments is about the reduction of the bit errors of optical signals (digital signals) inputted, the optical signals to be inputted can also be analog signals. In this case, the phase errors of the analog signals are reducible.

What is claimed is:

1. An effective optical path length compensable optical device for receiving an optical signal having two polarization components as an input and outputting the optical signal to an external path, comprising:

a substrate; and a plurality of optical waveguides, at least one of said plurality of optical waveguides having a double refraction, each of said plurality of optical waveguides for propagating two polarization components of the optical signal, and at least one of said plurality of optical waveguides being disposed on said substrate;

said plurality of optical waveguides being designed such that when the optical signal propagates through said plurality of optical waveguides, two inter-polarization effective optical path lengths for the optical signal are equal to each other, each of the effective optical path lengths being defined as a product of a refraction index and length of said optical waveguide.

2. An optical device as defined in claim 1, wherein, for equalizing said two inter-polarization effective optical path lengths for said optical signal to each other, said plurality of optical waveguides comprises two double refraction optical waveguides, contrary in double refraction characteristic based on polarization to each other, connected in series to each other.

3. An optical device as defined in claim 2, wherein said two double refraction optical waveguides are coupled in series to each other through polarization maintaining fibers capable of maintaining a polarization condition of said optical signal.

4. An optical device as defined in claim 3, wherein lengths of said two double refraction optical waveguides are set to offset double refraction characteristics of said two double refraction optical waveguides and said polarization maintaining fibers as a whole.

5. An optical device as defined in claim 1, wherein, for equalizing said two inter-polarization effective optical path lengths for said optical signal to each other, said plurality of optical waveguides are formed on said substrate having a double refraction and a polarization maintaining fiber contrary in double refraction characteristic based on polarization to said plurality of optical waveguides is coupled to said plurality of optical waveguides on said substrate.

6. An optical device as defined in claim 1, wherein, for equalizing said two inter-polarization effective optical path lengths for said optical signal to each other, a plurality of optical communication elements having a double refraction are in connection and double refractions of said plurality of optical communication elements are determined to be offset as a whole.

7. An optical device as defined in claim 1, wherein, for equalizing said two inter-polarization effective optical path lengths for said optical signal to each other, said plurality of optical waveguides having the same length are formed on a substrate having a double refraction and said plurality of optical waveguides are coupled to each other through polarization maintaining fibers capable of maintaining a polarization condition of said optical signal, and the double refractions of said plurality of optical waveguides and, said polarization maintaining fibers are determined to be offset as a whole.

8. An optical device as defined in claim 7, wherein said polarization maintaining fibers are made to conduct the conversion of a polarization condition of said optical signal propagating.

9. An optical device as defined in claim 1, wherein, for equalizing said two inter-polarization effective optical path lengths for said optical signal to each other, said substrate includes a plurality of substrates having the same double refraction and two optical waveguides of said plurality of optical waveguides equal in length to each other are formed on each of said plurality of substrates while said two optical waveguides on said plurality of substrates are coupled in series to each other in a state where polarization maintaining fibers capable of conducting the conversion of a polarization condition of said optical signal are put there between and double refractions of said two optical waveguides on said plurality of substrates and said polarization maintaining fibers are offset as a whole.

10. An optical device as defined in claim 1, wherein, for equalizing said two inter-polarization effective optical path lengths for said optical signal to each other, said plurality of optical waveguides comprises:

a polarization separating section for separating a polarization condition of said optical signal inputted;

two paths for wave-guiding optical signals polarization-separated in said polarization separating section, respectively; and a multiplexing section for again multiplexing said two optical signals wave-guided through said paths, wherein one of said two paths for wave-guiding said optical signal, having a smaller refractive index, of the two polarization-separated optical signals is set to be longer than the other.

11. An optical device as defined in claim 1, wherein, for equalizing said two inter-polarization effective optical path lengths for said optical signal to each other, said plurality of optical waveguides comprises:

a polarization separating section for separating a polarization condition of said optical signal inputted;

two paths for wave-guiding optical signals polarization-separated in said polarization separating section, respectively; and a multiplexing section for again multiplexing said two optical signals wave-guided through said paths, wherein an area constituting at least a portion of one of said two paths is formed with a buffer layer differing from the other path.

12. An optical device as defined in claim 1, wherein, for equalizing said two inter-polarization effective optical path lengths for said optical signal to each other, at least one of said optical waveguides is formed on a substrate having a double refraction and, a polarization condition converting element for performing the conversion of a polarization condition of said optical signal is disposed at an intermediate position of said optical waveguide.

13. An optical device as defined in claim 1, wherein said plurality of optical waveguides comprises:

a polarization separating section for separating a polarization condition of said optical signal inputted;

two paths for wave-guiding two optical signals polarization-separated in said polarization separating section; and a multiplexing section for again multiplexing said two optical signals wave-guided through said paths, wherein a polarization condition converting element for performing the conversion of a polarization condition of each of said two optical signals polarization-separated in said polarization separating section is placed at a position where said two inter-polarization effective optical path lengths for said optical signal become equal to each other.

14. An effective optical path length compensable optical device as defined in claim 1, wherein said plurality of optical waveguides comprises:

two double refraction optical waveguides, said two double refraction optical waveguides being connected in series to each other, and inter-polarization double refraction characteristic of said two double refraction optical waveguides being contrary to each other.

15. An effective optical path length compensable optical device as defined in claim 14, wherein said plurality of optical waveguides further comprises:

a polarization maintaining fiber which is capable of maintaining a polarization condition of the optical signal, said two double refraction optical waveguides are coupled in series to each other through said polarization maintaining fiber.

16. An effective optical path length compensable optical device as defined in claim 15, wherein lengths of said two double refraction optical waveguides are set to offset double refraction characteristics of said two double refraction optical waveguides and said polarization maintaining fibers as a whole.

17. An effective optical path length compensable optical device as defined in claim 1, wherein said plurality of optical waveguides comprises:

a double refraction optical waveguide; and a polarization maintaining fiber;

said double refraction optical waveguide being disposed on said substrate, and inter-polarization double refraction characteristic of said double refraction optical waveguide and said polarization maintaining fiber being contrary to each other.

18. An effective optical path length compensable optical device as defined in claim 1, wherein said plurality of optical waveguides comprises:

an even number of double refraction optical waveguides; and plural polarization maintaining fibers, each maintaining a polarization condition of the optical signal, each said double refraction optical waveguides having identical double refraction and identical length, and said even number of double refraction optical waveguides being coupled in series to each other through said polarization maintaining fibers.

19. An effective optical path length compensable optical device as defined in claim 1, wherein, for equalizing the two inter-polarization effective optical path lengths for the optical signal to each other, said plurality of optical waveguides comprises:

a polarization separating section for separating a polarization condition of the optical signal;

two paths for wave-guiding optical signals polarization-separated in said polarization separating section, respectively; and a multiplexing section for multiplexing the two optical signals wave-guided through said paths, wherein one of said two paths for wave-guiding the optical signal, having a smaller refractive index, of the two polarization-separated optical signals is set to be longer than the other.

20. An effective optical path length compensable optical device as defined in claim 1, wherein, for equalizing the two inter-polarization effective optical path lengths for the optical signal to each other, said plurality of optical waveguides comprises:

a polarization separating section for separating a polarization condition of the optical signal;

two paths for wave-guiding optical signals polarization-separated in said polarization separating section, respectively; and a multiplexing section for multiplexing the two optical signals wave-guided through said paths, wherein an area constituting at least a portion of one of said two paths is formed with a buffer layer differing from the other path.

21. An effective optical path length compensable optical device as defined in claim 1, wherein said plurality of optical waveguides comprises:

a polarization separating section for separating a polarization condition of the optical signal;

two paths for wave-guiding two optical signals polarization-separated in said polarization separating section; and a multiplexing section for multiplexing the two optical signals wave-guided through said paths, wherein a polarization condition converting element for performing the conversion of a polarization condition of each of the two optical signals polarization-separated in said polarization separating section is placed at a position where the two inter-polarization effective optical path lengths for the optical signal become equal to each other.

22. An effective optical path length compensable optical device for receiving an optical signal having two polarization components as an input and outputting the optical signal to an external path, comprising:

a plurality of optical waveguides;

at least one of said plurality of optical waveguides having a double refraction, each of said plurality of optical waveguides propagating two polarization components of the optical signal, and said plurality of optical waveguides being designed such that when the optical signal propagates through said optical waveguides, two inter-polarization effective optical path lengths for the optical signal are equal to each other, each of the effective optical path lengths being defined as a product of a refraction index and length of said optical waveguide.

23. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein, for equalizing said two inter-polarization effective optical path lengths for said optical signal to each other, said optical waveguide means comprises two double refraction optical waveguides, contrary in double refraction characteristic based on polarization to each other, connected in series to each other.

24. An optical device as defined in claim 23, wherein said two double refraction optical waveguides are coupled in series to each other through polarization maintaining fibers capable of maintaining a polarization condition of said optical signal.

25. An optical device as defined in claim 24, wherein lengths of said two double refraction optical waveguides are set to offset double refraction characteristics of said two double refraction optical waveguides and said polarization maintaining fibers as a whole.

26. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein, for equalizing said two inter-polarization effective optical path lengths for said optical signal to each other, said optical waveguide means is formed on said substrate means with said double refraction and a polarization maintaining fiber contrary in double refraction characteristic based on polarization to said optical waveguide means is coupled to said optical waveguide means on said substrate means.

27. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein, for equalizing said two inter-polarization effective optical path lengths for said optical signal to each other, said substrate means includes a plurality of substrates having the same double refraction and two optical waveguides of said optical waveguide means equal in length to each other are formed on each of said plurality of substrates while said optical waveguides on said plurality of substrates are coupled in series to each other in a state where polarization maintaining fibers capable of conducting the conversion of a polarization condition of said optical signal are put there between and double refractions of said optical waveguides on said plurality of substrates and said polarization maintaining fibers are offset as a whole.

28. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein, for equalizing said two inter-polarization effective optical path lengths for said optical signal to each other, said optical waveguide means comprises:

a polarization separating section for separating a polarization condition of said optical signal inputted;

two paths for wave-guiding optical signals polarization-separated in said polarization separating section, respectively; and a multiplexing section for again multiplexing said two optical signals wave-guided through said paths, wherein one of said two paths for wave-guiding said optical signal, having a smaller refractive index, of the two polarization-separated optical signals is set to be longer than the other.

29. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein, for equalizing said two inter-polarization effective optical path lengths for said optical signal to each other, said optical waveguide means comprises:

a polarization separating section for separating a polarization condition of said optical signal inputted;

two paths for wave-guiding optical signals polarization-separated in said polarization separating section, respectively; and a multiplexing section for again multiplexing said two optical signals wave-guided through said paths, wherein an area constituting at least a portion of one of said two paths is formed with a buffer layer differing from the other path.

30. An effective optical path length compensable optical device made such that optical waveguide means is formed on substrate means having a double refraction and, when an optical signal propagates through said optical waveguide means, two inter-polarization effective optical path lengths for said optical signal are equal to each other, wherein said optical waveguide means comprises:

a polarization separating section for separating a polarization condition of said optical signal inputted;

two paths for wave-guiding two optical signals polarization-separated in said polarization separating section; and a multiplexing section for again multiplexing said two optical signals wave-guided through said paths, wherein a polarization condition converting element for performing the conversion of a polarization condition of each of said two optical signals polarization-separated in said polarization separating section is placed at a position where said two inter-polarization effective.

* * * * *

UNITED STATES PATENT AND TRADEMARK OFFICE

CERTIFICATE OF CORRECTION

PATENT NO. : 6,337,931 B1
DATED : January 8, 2002
INVENTOR(S) : Minoru Seino

It is certified that error appears in the above-identified patent and that said Letters Patent is hereby corrected as shown below:

<u>Column 30,</u>
Line 59, after "effective" insert -- optical path lengths for said optical signal become equal to each other --.

Signed and Sealed this

Twenty-eighth Day of May, 2002

*Attest:*

JAMES E. ROGAN

*Attesting Officer*

*Director of the United States Patent and Trademark Office*